(12) United States Patent
Lopez et al.

(10) Patent No.: US 9,172,445 B2
(45) Date of Patent: Oct. 27, 2015

(54) MULTI-USER MULTIPLE INPUT MULTIPLE OUTPUT RADIO COMMUNICATIONS

(75) Inventors: Miguel Lopez, Solna (SE); Mårten Sundberg, Årsta (SE); Olof Liberg, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 426 days.

(21) Appl. No.: 13/572,930

(22) Filed: Aug. 13, 2012

(65) Prior Publication Data
US 2014/0044089 A1 Feb. 13, 2014

(51) Int. Cl.
*H04L 5/14* (2006.01)
*H04B 7/04* (2006.01)
*H04W 72/04* (2009.01)
*H04L 27/18* (2006.01)

(52) U.S. Cl.
CPC .............. *H04B 7/0452* (2013.01); *H04L 27/18* (2013.01); *H04W 72/048* (2013.01)

(58) Field of Classification Search
CPC ............................ H04W 72/08; H04W 72/048
USPC ......................................................... 370/329
See application file for complete search history.

(56) References Cited

U.S. PATENT DOCUMENTS

| | | | |
|---|---|---|---|
| 8,687,559 B2* | 4/2014 | Kreuzer ........................ 370/328 |
| 2011/0205947 A1* | 8/2011 | Xin et al. ...................... 370/311 |
| 2012/0113963 A1 | 5/2012 | Liberg et al. |
| 2012/0155356 A1* | 6/2012 | Lei et al. ....................... 370/311 |
| 2012/0220292 A1* | 8/2012 | Yu et al. ........................ 455/424 |
| 2012/0244817 A1* | 9/2012 | Das et al. .................... 455/67.11 |
| 2013/0163443 A1* | 6/2013 | Liberg et al. ................. 370/252 |

FOREIGN PATENT DOCUMENTS

WO WO 2011/020517 2/2011

OTHER PUBLICATIONS

3GPP TSG GERAN#53, "Wide Pulse for VAMOS", Hamburg Germany, Feb. 27-Mar. 2, 2012, Source: Telefon AB LM Ericsson, ST-Ericsson, Tdoc GP-120152, Agenda item 7.1.5.1.4, 8 pages.
3GPP TS 45.004 v10.0.0 (Mar. 2011), Modulation (Release 10), entire document (see in particular Section 2, p. 5; Section 6, p. 14; and Section 3.5, p. 5).

(Continued)

*Primary Examiner* — Shaq Taha
(74) *Attorney, Agent, or Firm* — Patent Portfolio Builders, PLLC

(57) ABSTRACT

A radio communications system conducts radio communications using basic physical channels. Each basic physical channel defines a time slot and a radio frequency for transmission. Radio communication is established between a radio base station and multiple UEs over the same basic physical channel. Three or four subchannels are provided in the same basic physical channel to simultaneously support three or four full rate UE communications, seven or eight half rate UE communications, or other equivalent combinations. A first baseband transmitter chain can map full rate data corresponding to first and second full rate UE communications (or equivalent) as adaptive quadrature phase shift keying, AQPSK, signals onto a first and a second of the three subchannels. A second baseband transmitter chain can map full rate data corresponding to a third and/or fourth full rate UE communication (or equivalent) as phase shifted signals onto a third of the three subchannels.

30 Claims, 17 Drawing Sheets

(56) References Cited

OTHER PUBLICATIONS

3GPP TS 45.005 v10.4.0 (Mar. 2012), Radio Transmission and Reception (Release 10), entire document (see in particular Section 4.2.1.3, p. 29).
Notification of Transmittal of the International Search Report and the Written Opinion mailed Feb. 20, 2014 in in International Application No. PCT/SE2013/050715.
Written Opinion of the International Search Authority mailed Feb. 20, 2014 in International Application No. PCT/SE2013/050715.
International Search Report mailed Feb. 20, 2014 in International Application No. PCT/SE2013/050715.
3GPP TSG-GERAN Meeting #42, "SAM—Single Antenna MIMO—for VAMOS", GP-090735, Shenzhen, P.R. China, May 11-15, 2009.
3GPP TSG GERAN WG1#43, "Enhanced Channel Organization Schemes for Half-rate SACCH", GP-091219, Vancouver, Canada, Sep. 1-3, 2009.

* cited by examiner

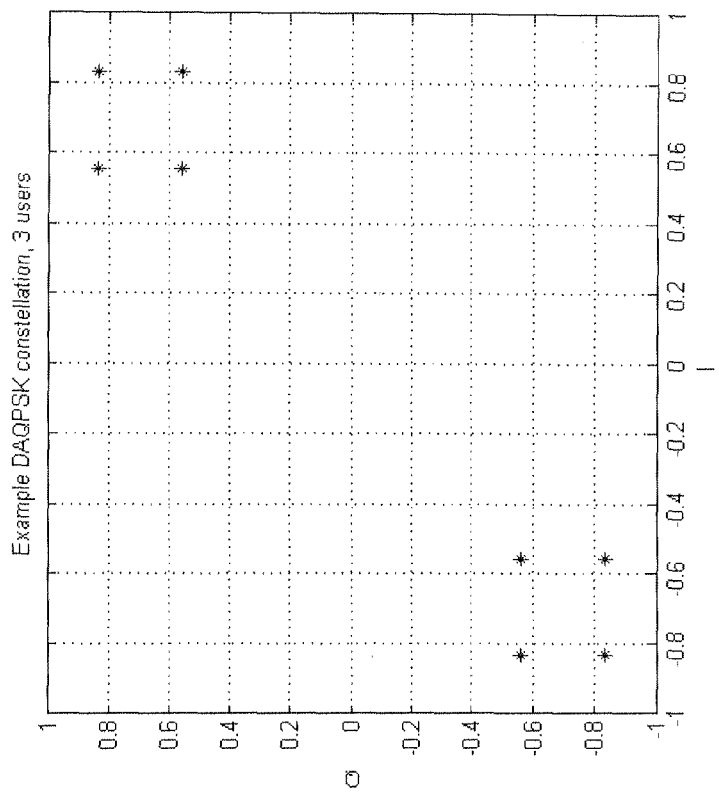
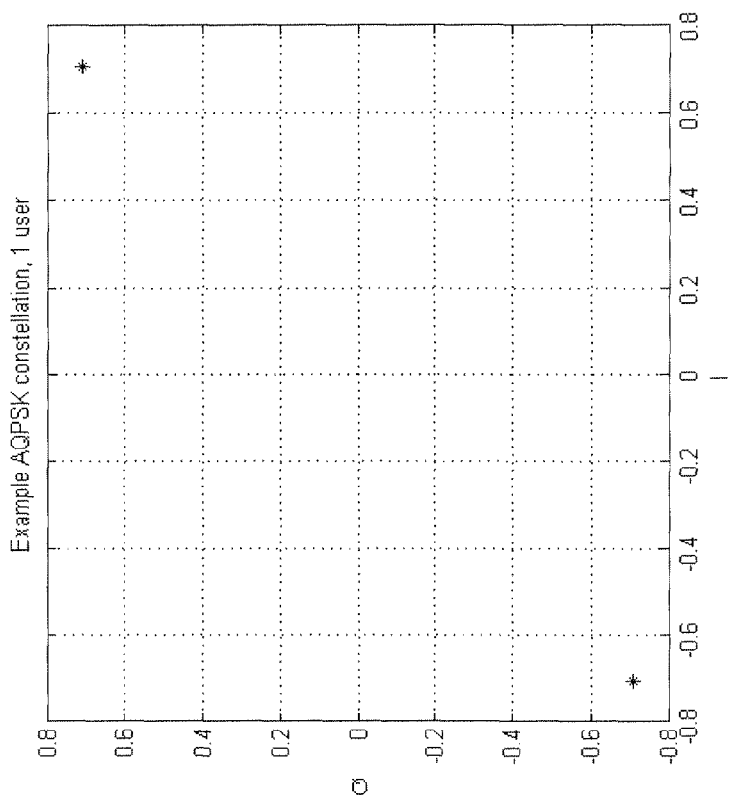
Figure 10B
Figure 10A

MULTI-USER MULTIPLE INPUT MULTIPLE OUTPUT RADIO COMMUNICATIONS

TECHNICAL FIELD

The technology relates to radio communications, and in particular, to multiplexing multiple user equipment (UE) radio communications onto one radio resource.

BACKGROUND

FIG. 1 illustrates an example GSM-based cellular wireless communications system 2. A plurality of mobile stations (MSs) 10 (sometimes called mobile terminals, user equipments (UEs), etc.) are located in a geographical service area covered by cells C1 through C6. Radio base stations (RBSs) 4 are positioned within the geographic area covered by the cells C1 through C6 and act as an interface between the mobile station 10 and the wireless communications system 2. The radio base stations 4 are typically connected to a base station controller (BSC) 6 or radio network controller (RNC), which in turn is connected to one or more core network nodes like a mobile switching center (MSC), a serving GSM support node (SGSN), etc. The BSC 6 may be connected to other BSCs, and the core network node(s) are usually coupled to external networks like a public switched telephone network (PSTN) 8 and/or the Internet.

The GSM wireless communications system 2 in FIG. 1 has only a limited frequency band it is allowed to use. Each cell is assigned a set of channels in the allowed frequency band. Each set of channels is reused after separation of a certain number of cells so that adjacent cells are assigned a different set of channels to reduce/alleviate co-channel interference. Thus, for wireless communications systems that divide the spectrum into narrow frequency bands like GSM, careful frequency planning is usually required. Each frequency band is divided into frames, and in GSM, each frame includes eight time slot radio channels. Thus, GSM is a time division multiple access (TDMA) system which divides a narrow frequency band into different time slots, where each repeating time slot in the frame can be assigned as a separate communications channel resource. The following steps transform speech audio to radio waves at a GSM transmitter and vice versa at a GSM receiver: speech coding, channel coding, interleaving, burst assembling, ciphering, modulation (e.g, GMSK modulation), and then radio transmission. If the source of information is data (not speech), the speech coding is not performed.

The rapid growth of the subscriber base in GSM has stressed the need for increased voice and data capacity. With the advent of machine-to-machine communications, GSM traffic is expected to grow even more. In addition, with the success of mobile broadband and smart phones, spectrum efficiency and hardware efficiency become even more important. Operators foresee the need to re-farm the GSM spectrum to WCDMA or LTE, but at the same time, GSM voice remains one of the main sources of revenue. All of these needs make it desirable to pack more GSM traffic into existing or fewer frequency bands. Mobile network operators and telecom equipment manufacturers have recently standardized the feature "Voice services over Adaptive Multi-user channels on One Slot" (VAMOS), which multiplexes two users onto one time slot channel instead of just one user. But despite the improvements brought about by VAMOS, it is important to optimize even further the hardware and spectral efficiencies of GSM and similar networks.

SUMMARY

A radio base station is provided for use in a radio communications system that conducts radio communications over a radio interface using basic physical channels. Each basic physical channel defines a time slot and a radio frequency for transmission. Circuitry is configured to establish radio communication between a radio base station and multiple user equipments (UEs) over the same basic physical channel. A first baseband transmitter chain is configured so that it can map full rate data corresponding to first and second full rate UE communications (or equivalent) as adaptive quadrature phase shift keying, AQPSK, signals onto a first and a second of the three subchannels. A second baseband transmitter chain is configured so that it can map full rate data corresponding to a third full rate UE communication (or equivalent) as phase shifted signals onto a third of the three subchannels.

In one non-limiting example embodiment, the first baseband transmitter chain is configured so that it can map full rate data corresponding to the first and second full rate UE communications as AQPSK signals onto the first and second subchannels and the second baseband transmitter chain is configured so that it can map full rate data corresponding to the third full rate UE communication as rotated binary phase shift keying signals or as Gaussian minimum shift keying signals onto the third subchannel.

In a non-limiting example implementation, the first baseband transmitter chain includes mapping circuitry configured so that it can map full rate data corresponding to the first and second full rate UE baseband communications in a complex plane using a first angle associated with a subchannel power imbalance. The first and second baseband transmitter chains are configured to apply a scaling factor based on a second angle associated with a dual-channel subchannel power imbalance to a signal generated by the first baseband transmitter chain and to a signal generated by the second baseband transmitter chain. The second baseband transmitter chain includes first phase shifting circuitry configured to apply a first phase shift angle to the scaled signal. A summer configured to sum the signals from the first and second baseband transmitter chains, and pulse shaping circuitry receives the summed signal and shape pulses corresponding to the symbols in the summed signal. RF modulation circuitry converts the pulses received from the pulse shaping circuitry to an RF signal, and an antenna transmits the RF signal over the same basic physical channel. The circuitry may further include second phase shifting circuitry to apply a second phase shift angle to the summed signal prior to processing by the pulse shaping circuitry.

In another non-limiting example implementation, the second baseband transmitter chain includes first phase shifting circuitry configured to apply a first phase shift angle to the scaled signal. Second phase shifting circuitry is configured to apply a second phase shift angle to the scaled signal. Pulse shaping circuitry is configured to receive a signal from the respective second phase shifting circuitry and shape pulses corresponding to the symbols in the received signal. RF modulation circuitry is configured to convert the pulses received from the pulse shaping circuitry to an RF signal, and an antenna transmits the RF signal over the same time slot channel.

Each of the three subchannels may be configured to simultaneously support one full rate UE communication and its associated control signaling or two different half rate UE communications and their associated control signaling. Alternatively, the three subchannels may be configured to simultaneously support six different half rate UE communications and their associated control signaling. For example, a first baseband transmitter chain maps half rate data corresponding to first, second, third, and fourth half rate UE communications as AQPSK signals onto the first and second subchannels, and a second baseband transmitter chain maps half rate data corresponding to fifth and sixth half rate UE communications as phase shifted signals onto the third subchannel. Moreover, the three subchannels may be configured to simultaneously support some combination of full and half rate UE communications with their respective control signaling that is equivalent to three full rate UE communications.

In a second, non-limiting example embodiment, a fourth subchannel is provided in the same basic physical channel. Each of the four subchannels is configured to simultaneously carry one full rate UE communication and its associated control signaling or two different half rate UE communications and their associated control signaling. Moreover, the three subchannels may be configured to simultaneously support some combination of full and half rate UE communications with their respective control signaling that is equivalent to four full rate UE communications.

For the second, non-limiting example embodiment, the first baseband transmitter chain may be configured to map full rate data as AQPSK signals corresponding to first and second full rate UE baseband communications onto the first and second subchannels and the second transmitter chain may be configured to map full rate data corresponding to third and fourth full rate UE baseband communications as AQPSK signals onto the third and fourth subchannels.

In another example implementation for the second embodiment, the first baseband transmitter chain includes mapping circuitry configured to map full rate data corresponding to first and second full rate UE baseband communications in a complex plane using a first angle associated with a subchannel power imbalance. The second baseband transmitter chain includes mapping circuitry configured to map full rate data corresponding to third and fourth full rate UE baseband communications in a complex plane using a second angle associated with the subchannel power imbalance. The first and second baseband transmitter chains are configured to apply a scaling factor based on a third angle associated with a dual-channel subchannel power imbalance to a signal generated by the first baseband transmitter chain and to a signal generated by the second baseband transmitter chain. The second baseband transmitter chain includes first phase shifting circuitry configured to apply a first phase shift angle to the scaled signal. A summer sums the signals from the first and second baseband transmitter chains, and pulse shaping circuitry shapes pulses corresponding to the symbols in the summed signal. RF modulation circuitry converts the pulses received from the pulse shaping circuitry to an RF signal, and an antenna transmits the RF signal over the same basic physical channel. Second phase shifting circuitry is configured to apply a second phase shift angle to the summed signal prior to processing by the pulse shaping circuitry.

In another non-limiting example implementation, the second baseband transmitter chain includes first phase shifting circuitry configured to apply a first phase shift angle to the scaled signal, and the first and second baseband transmitter chains each include second phase shifting circuitry configured to apply a second phase shift angle to the scaled signal. Pulse shaping circuitry is configured to receive a signal from the respective second phase shifting circuitry and shape pulses corresponding to the symbols in the received signal. RF modulation circuitry converts the pulses received from the pulse shaping circuitry to an RF signal, and an antenna transmits the RF signal over the same basic physical channel.

In another non-limiting example implementation, the four subchannels are configured to simultaneously carry eight different half rate UE communications. The first baseband transmitter chain to maps half rate data corresponding to first, second, third, and fourth half rate UE baseband communications as quadrature AQPSK signals onto the first and second subchannels. The second baseband transmitter chain maps half rate data corresponding to fifth, sixth, seventh, and eighth half rate UE baseband communications as phase shifted signals onto the third and fourth subchannels.

An advantageous feature is that radio transmissions associated with the first and second baseband transmitter chains are backwards compatible to legacy base stations and legacy UEs.

For uplink communications, the base station includes receiver circuitry configured to receive on a same basic physical channel three or four different full rate UE communications and to demodulate the three or four different full rate UE communications using different training sequences associated with each of the three or four different full rate UE communications. Alternatively, the receiver circuitry is configured to receive on a same basic physical channel up to four full rate UE communications, up to seven or eight different half rate UE communications, or a combination of full rate and half rate UE communications that have a capacity corresponding to four full rate UE communications and to demodulate up to four full rate UE communications, up to seven or eight different half rate UE communications, or the combination of full rate and half rate UE communications using different training sequences associated with each of the different UE communications.

Another aspect of the technology includes a method implemented in a radio base station for radio communications over a radio interface using basic physical channels, where each basic physical channel defines a time slot and a radio frequency for transmission. The method includes the steps of:

establishing radio communication between the radio base station and multiple user equipments (UEs) over the same basic physical channel, where at least three subchannels are provided in the same basic physical channel that can simultaneously support an amount of data equivalent to three full rate UE communications, mapping by a first baseband transmitter onto a first and a second of the three subchannels a first amount of data equivalent to first and second full rate UE communications as adaptive quadrature phase shift keying, AQPSK, signals, and mapping by a second baseband transmitter onto a third of the three subchannels a second amount of data equivalent to a third full rate UE communication as phase shifted signals.

BRIEF DESCRIPTION OF THE DRAWINGS

FIG. 10A is a BPSK constellation for one UE;

FIG. 10B is an example DAQPSK constellation with 3 UEs;

DETAILED DESCRIPTION

Figure 1:
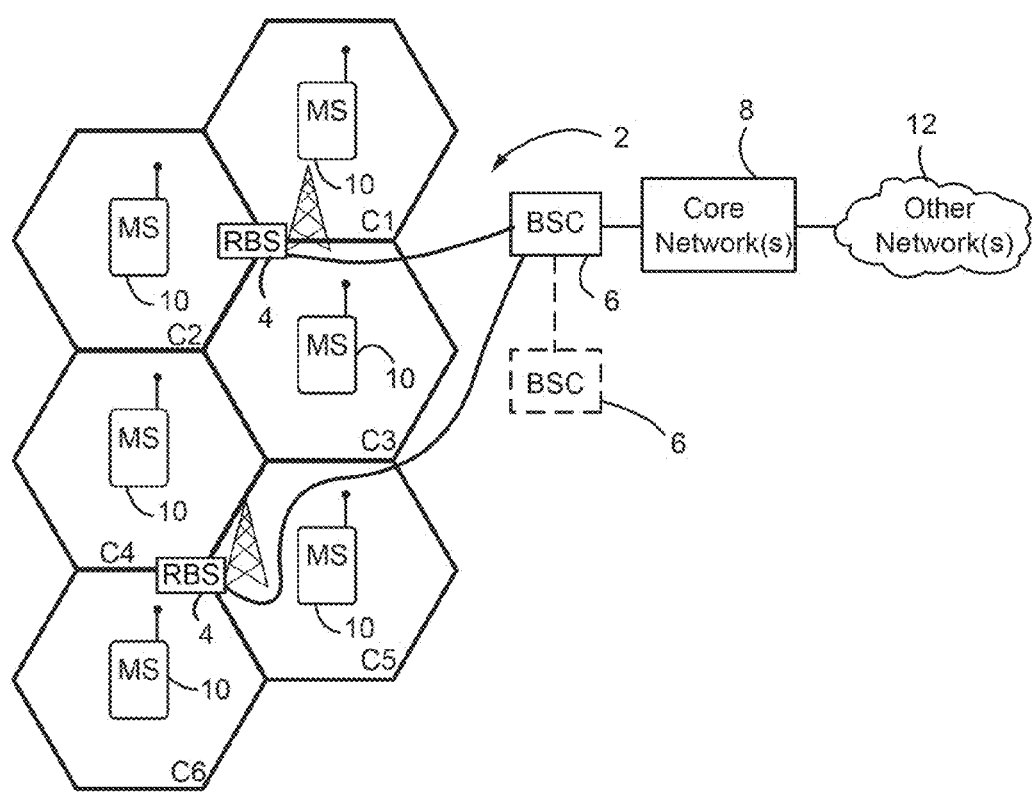
FIG. 1 illustrates an example GSM type cellular radio network.

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not to obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be embodied within any form of non-transitory, computer-readable memory, such as solid-state memory, magnetic disk, or optical disk containing an appropriate set of computer instructions that would cause one or more processors to carry out the techniques described herein.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be implemented by computer program instructions that may be stored in a non-transitory, computer-readable storage medium and which when executed by one or more computers or processors cause the processes to be performed, whether or not such computer(s) or processor(s) is(are) explicitly shown.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The functions of the various elements including functional blocks, including but not limited to those labeled or described as a computer, processor, or controller, may be provided through the use of hardware such as circuit hardware and/or hardware capable of executing software in the form of coded instructions stored on non-transitory, computer-readable medium. Thus, such functions and illustrated functional blocks are to be understood as being either hardware-implemented and/or computer-implemented, and thus machine-implemented.

The following description uses as an illustrative content a GSM-based system such as that in FIG. 1. But the principles described herein may have application to other time-slotted radio communications systems. Given the time-slotted frame structure of GSM, a Basic Physical Channel (BPC), defined in 3GPP TS 45.002 and used in 45.001, corresponds to one timeslot on one frequency in every TDMA frame on the digital radio interface between the BTS and the MS. With frequency hopping, the frequency changes between TDMA frames following a predefined frequency hopping sequence. Without frequency hopping the same frequency is used in all TDMA frames. A BPC may be used to carry different logical channel combinations. A Logical Channel (LCH) is a channel used for a particular type of traffic. For example, a TCH is a logical channel that carries speech traffic or circuit switched data, while a SACCH is a logical channel that carries signaling. Logical channels are mapped onto BPCs. Several LCHs may be mapped onto the same BPC, but only certain combinations may be allowed.

To increase capacity, GSM half rate voice was introduced as an alternative to full rate voice, and with it came a "subchannel" to transport half rate voice. A BPC can carry two subchannels. One subchannel carries a half rate voice call, and two subchannels carry a full rate voice call. A VAMOS Subchannel (VSC) also provides subchannels, either one full rate or two half rate. A legacy BPC can provide one VSC, but a VAMOS capable BPC can provide two VSCs. The VSCs are called VAMOS Subchannel 0 (VSC0) and VAMOS Subchannel 1 (VSC1). A VAMOS pair includes two CS subchannels, one on each VSC.

Although the description is in the context of enhancing the GSM air interface and targets circuit-switched voice services as an example, the technology is also applicable to packet-switched data services. The following description assumes that each mobile station (MS)/user equipment (UE) (often simply referred to as a user) needs to transmit speech frames, coded and time division multiplexed into time slots as specified in the GSM standards. The speech data sent by/to each user is statistically independent of the data sent by/to the other users.

Figure 2:
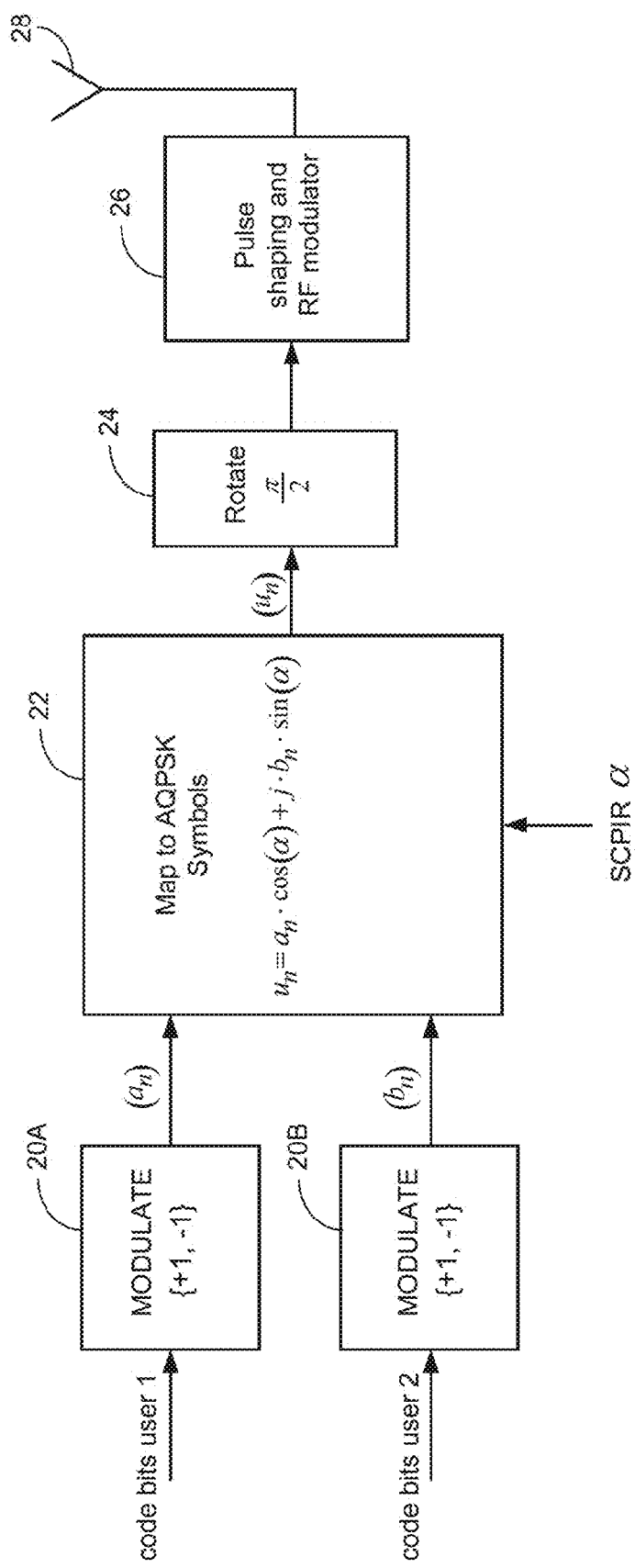
FIG. 2 depicts an example VAMOS modulator and transmitter.

The technology adapts existing VAMOS techniques to multiplex more subchannels/logical channels onto one BPC than heretofore was possible. The VAMOS air interface is based upon an Adaptive QPSK constellation (AQPSK). FIG. 2 depicts an example VAMOS modulator and transmitter. Coded bits from users 1 and 2 are modulated in a respective one of parallel modulators 1A, 1B into a stream of +1 and −1's labeled $a_n$ and $b_n$, respectively. Modulated streams $a_n$ and $b_n$ are map to AQPSK symbols $u_n$ in the complex plane in AQPSK mapper 2 as function of a parameter α that defines the shape of the AQPSK constellation and determines a Sub-Channel Power Imbalance Ratio (SCPIR). The mapping to $u_n = a_n \cos(\alpha) + jb_n \sin(\alpha)$. The AQPSK mapper 2 makes it is possible to multiplex two full rate speech users or four half rate speech users in one radio resource/BPC. AQPSK is backwards compatible with GSM mobiles and base stations. The AQPSK symbols $u_n$ are rotated by 90 degrees at block 3 and then they are pulse shaped and upconverted to RF at block 4 for transmission via antenna 5 over the one radio resource/BPC.

Figure 3:
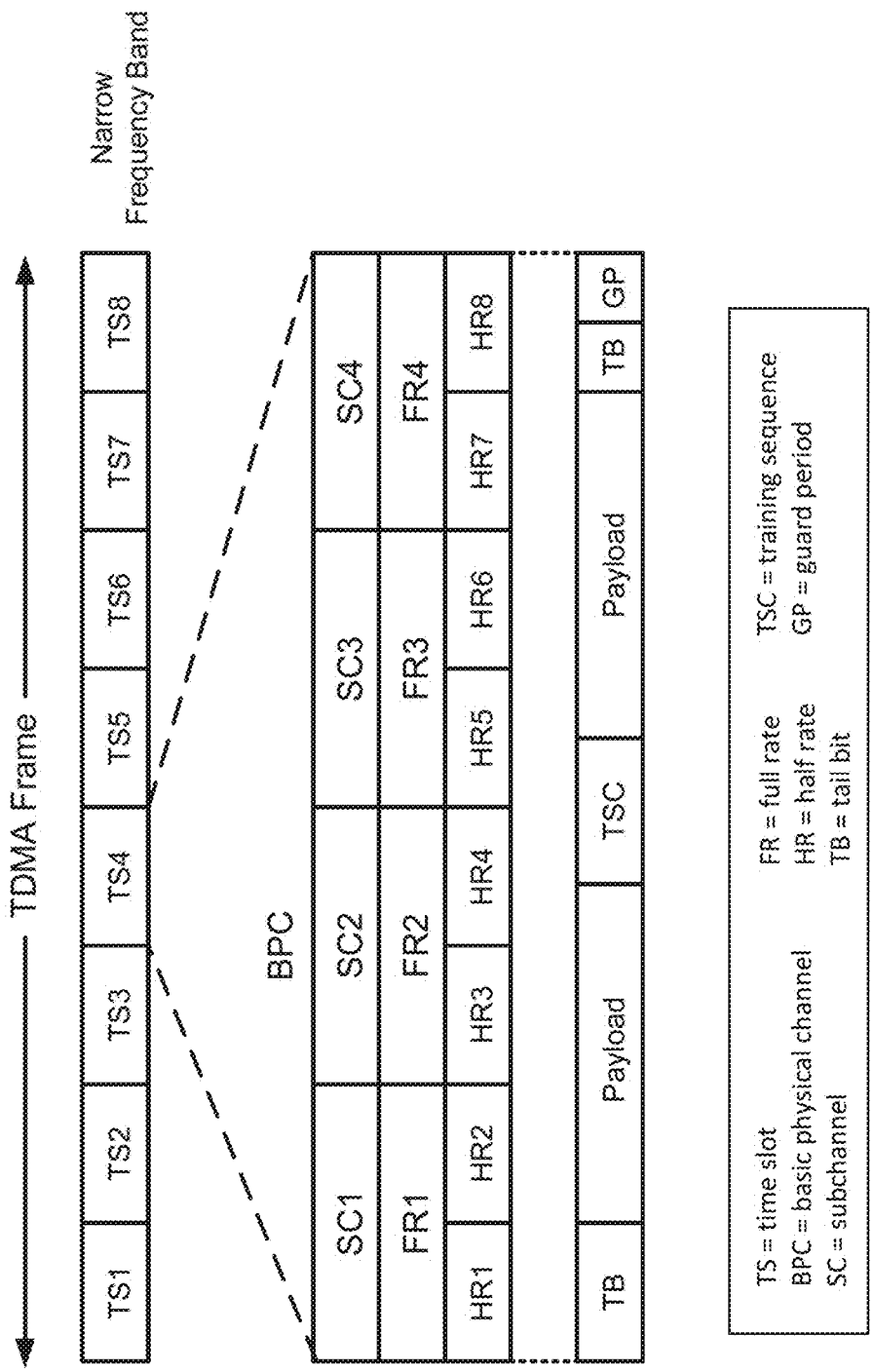
FIG. 3 illustrates a TDMA frame where each basic time slot radio resource supports 3 or 4 full rate UE communications or 7 or 8 half rate UE communications.

FIG. 3 illustrates a TDMA frame with eight time slots TS1-TS8 carried on a narrow frequency band, e.g., a 200 kHz wide band. The bottom of the figure shows that each time slot carries tail bits (TB) on each end, two payloads separated by a training sequence (TSC) in the middle, and completed by a guard period (GP). Current VAMOS techniques map two subchannels to a BPC to carry 1 or 2 full rate users/data streams or 3 or 4 half rate users/data streams. The technology described below doubles that capacity. As shown in FIG. 2, a single time slot corresponding to a single BPC is divided into four separate subchannels (four logical channels). Subchannel SC1 can serve as one full rate subchannel FR1 or as two half rate subchannels HR1 and HR2. In total, the technology described permits mapping to a single BPC (a single time slot in a frequency band) (a) 3 or 4 full rate users/data streams, (b) up to 8 half rate users/data streams, or a combination of full rate and half rate users/data streams with an amount of data that is equivalent to 3 or 4 full rate users/data streams. For example, a BPC can support 2 full rate+1 half rate users/data streams, 2 full rate+2 half rate users/data streams, 1 full rate+3 half rate users/data streams, 1 full rate+4 half rate users/data streams, 5 half rate users/data streams, 6 half rate users/data streams. In other words, each subchannel supports either one full rate or two half rate users/data streams.

Figure 4:
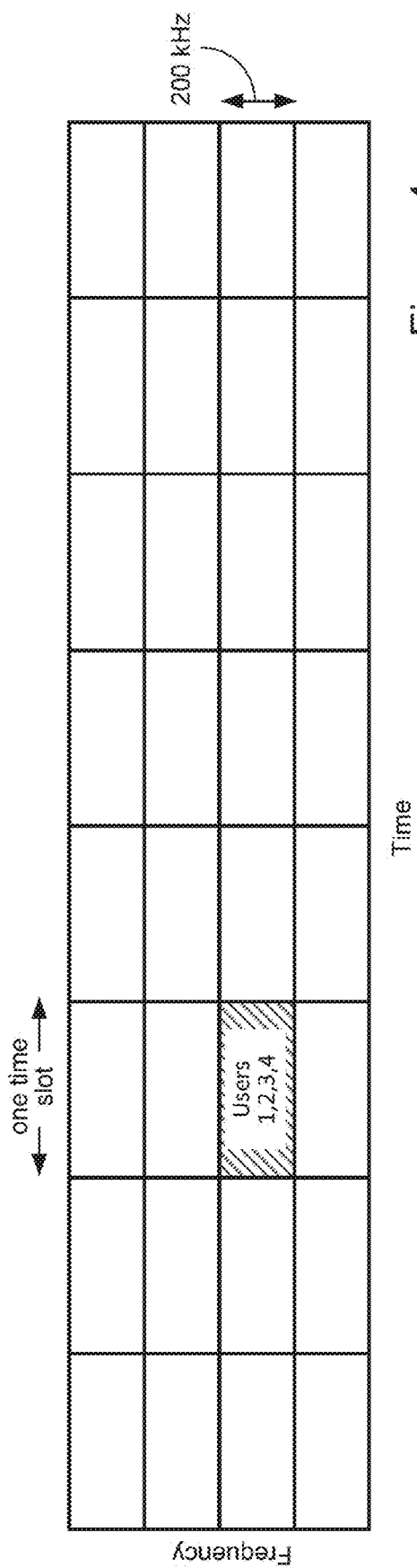
FIG. 4 illustrates 4 full rate users sharing the same time slot/frequency channel in both the uplink and downlink directions.

FIG. 4 is a time/frequency grid that shows four users sharing the same time slot and radio frequency channel, i.e., the same BPC or more generally, the same radio resource, for both uplink (UL) and downlink (DL) transmissions. The highlighted box represents the same radio resource that is shared by all users. The described technology creates 3 or 4 parallel sub-channels, both in the UL and DL.

In the uplink direction to the base station, each of the 3 or 4 MSs/UEs generates its own independent stream of code bits and transmits it using GMSK modulation. GSM based channel coding, multiplexing, and modulation may be used in the UE, e.g., according to as 3GPP TS 45.001-4. All 3 or 4 users shall share the same time slot and the same radio frequency channel, as illustrated in FIG. 4. Although in VAMOS mode, up to two users can transmit a burst in one time slot and radio frequency channel, technology described below extends the VAMOS concept to allow three or four users to transmit a burst in the same time slot and radio frequency channel. The network shall assign different training sequences to each user. The training sequences are preferably orthogonal to each other. The base station receiver uses the different training sequences in order to separate the users transmitting using the same radio resource. The result is a Multi-User Multiple Input Multiple Output (MU-MIMO) system.

Figure 5:
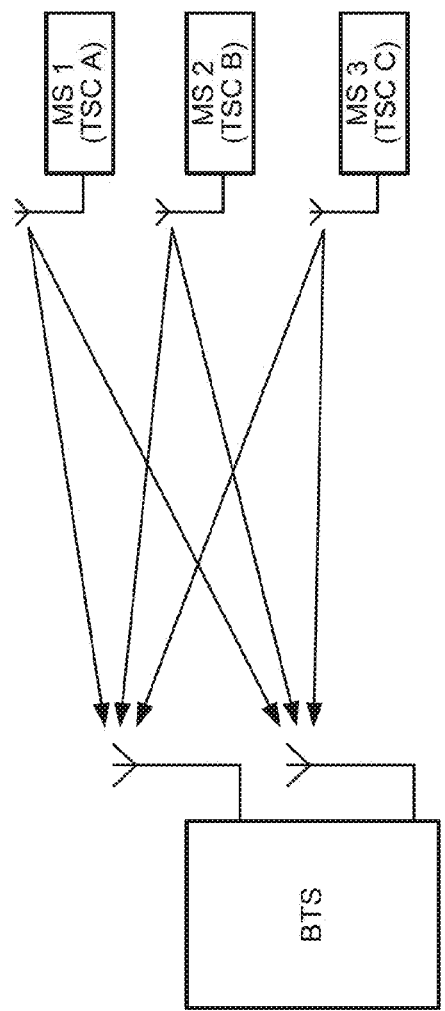
FIG. 5 illustrates an uplink transmission for a 3×2 MU-MIMO system.

For the uplink, FIG. 5 depicts an example 3×2 MU-MIMO system, where an M×N MU-MIMO system has M transmit antennas and N receive antennas. As shown, each MS has been assigned a different Training Sequence Code (TSC), labeled TSC A, TSC B, and TSC C. More than two users may be reliably detected even though only two receive antennas are used because GMSK modulated signals are inherently redundant, and either the I or Q quadrature components of a GMSK baseband signal are enough to demodulate one user.

Figure 6:
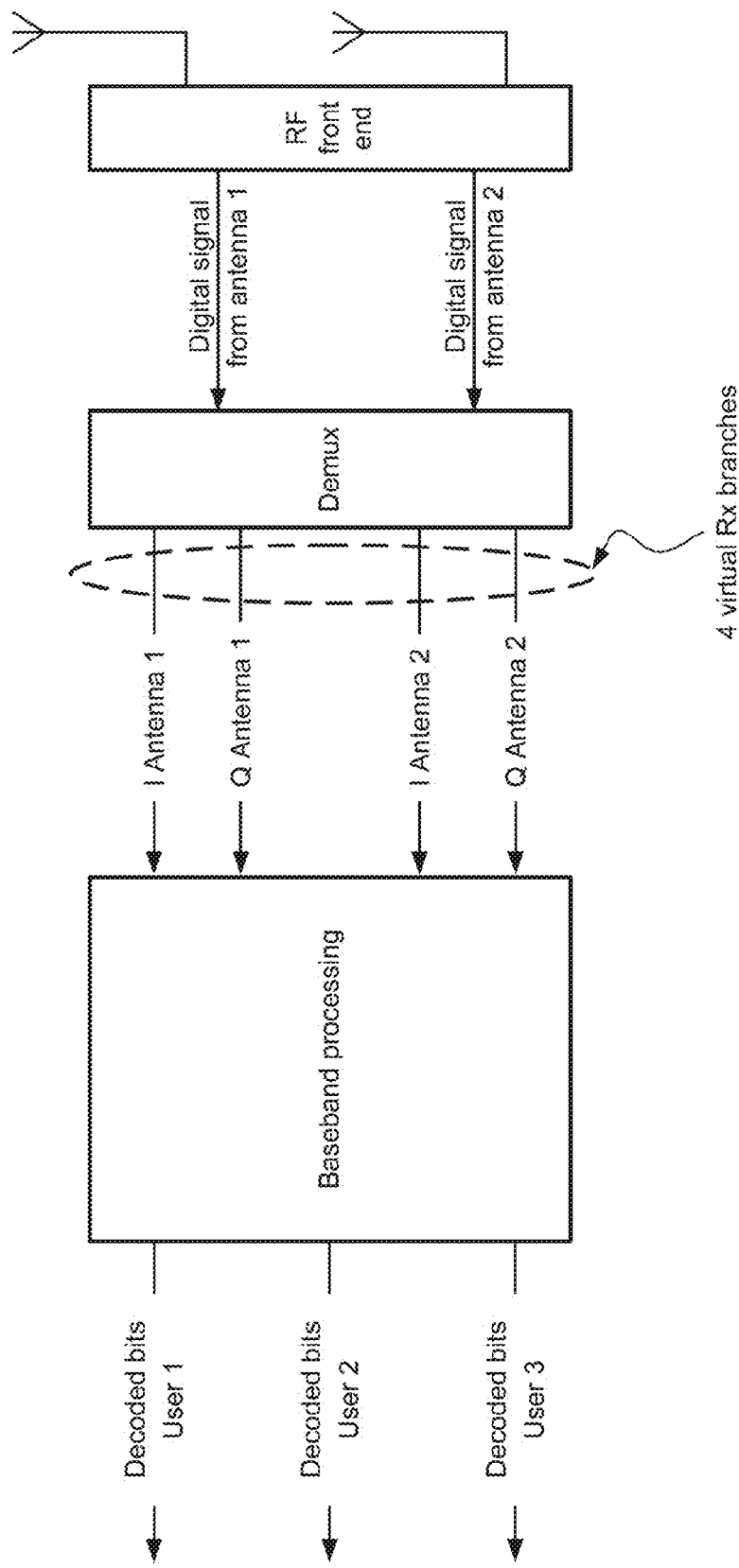
FIG. 6 illustrates an example receiver with two receiver branches transformed in a receiver with four virtual receiver branches.

FIG. 6 illustrates how 2 Rx branches at the base station receiving the 3 uplink signals may be transformed into 4 virtual branches, by splitting the complex-valued baseband signals into their I and Q components. Thus, a 3×2 MU-MIMO system may be transformed into a virtual 3×4 MU-MIMO system. This transformation may be extended to any number of Tx antennas and any number of Rx antennas.

Figure 7:
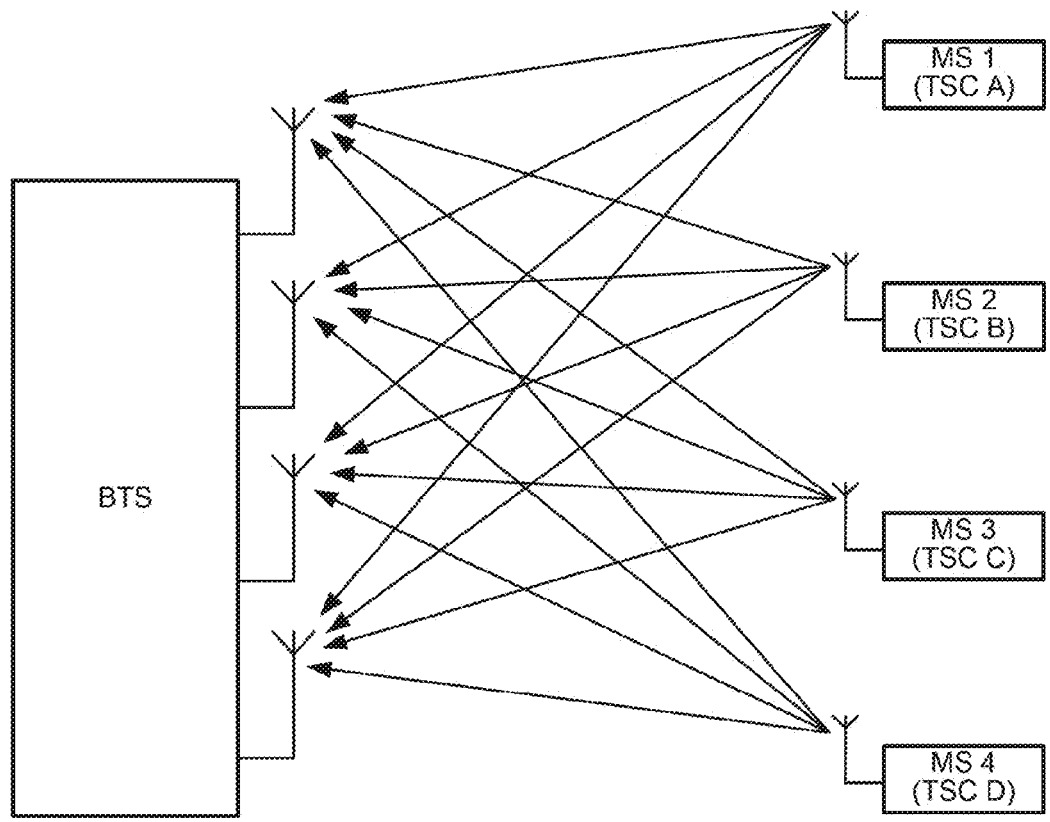
FIG. 7 depicts a 4×4 MU-MIMO system for an uplink transmission.

FIG. 7 depicts a 4×4 MU-MIMO system for uplink transmissions. Each of the four users is assigned a different TSC labeled TSC A, TSC B, TSC C, and TSC D. Other combinations of the number of transmit and receive antennas are possible.

By having the TDMA multiplexing and the modulation comply with 3GPP TS 45.001-4, the uplink receiver technology at the base station is backward compatible with legacy GSM MSs. For example, one or more of the users labeled MS1 to MS4 in FIG. 7 may be a legacy GSM MS.

For downlink transmission by the base station, channel coding and time division multiplexing into a time slot may be performed for each user, for example, according to as 3GPP TS 45.001-3. However, the modulation of code bits for each user is performed according to a new modulation technique referred to as Dual-AQPSK (DAQPSK). Many embodiments are possible depending on the hardware capabilities of the BTS and on the number of antennas involved.

Figure 8:
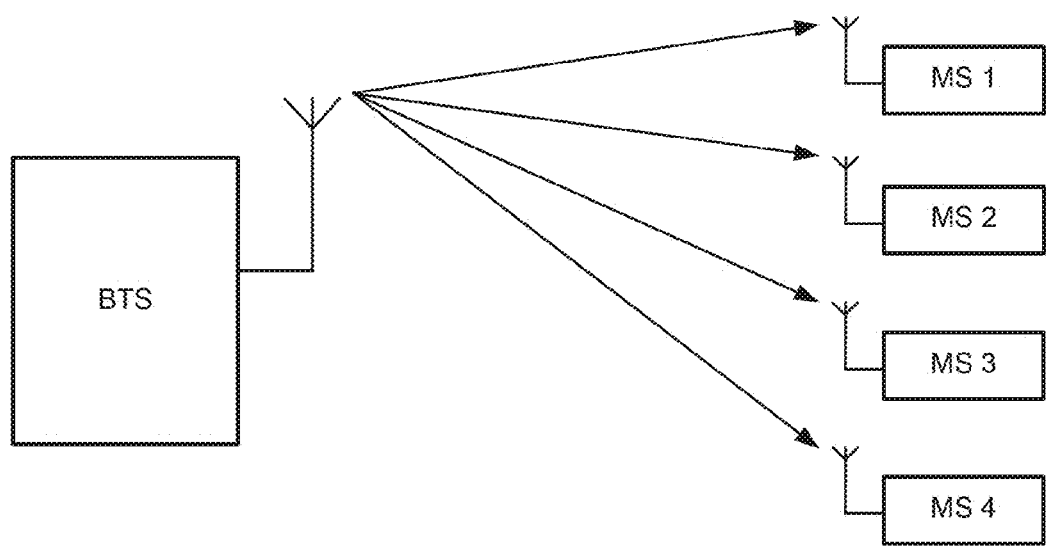
FIG. 8 shows a base station with one transmit antenna transmitting to four mobile radios.
Figure 9:
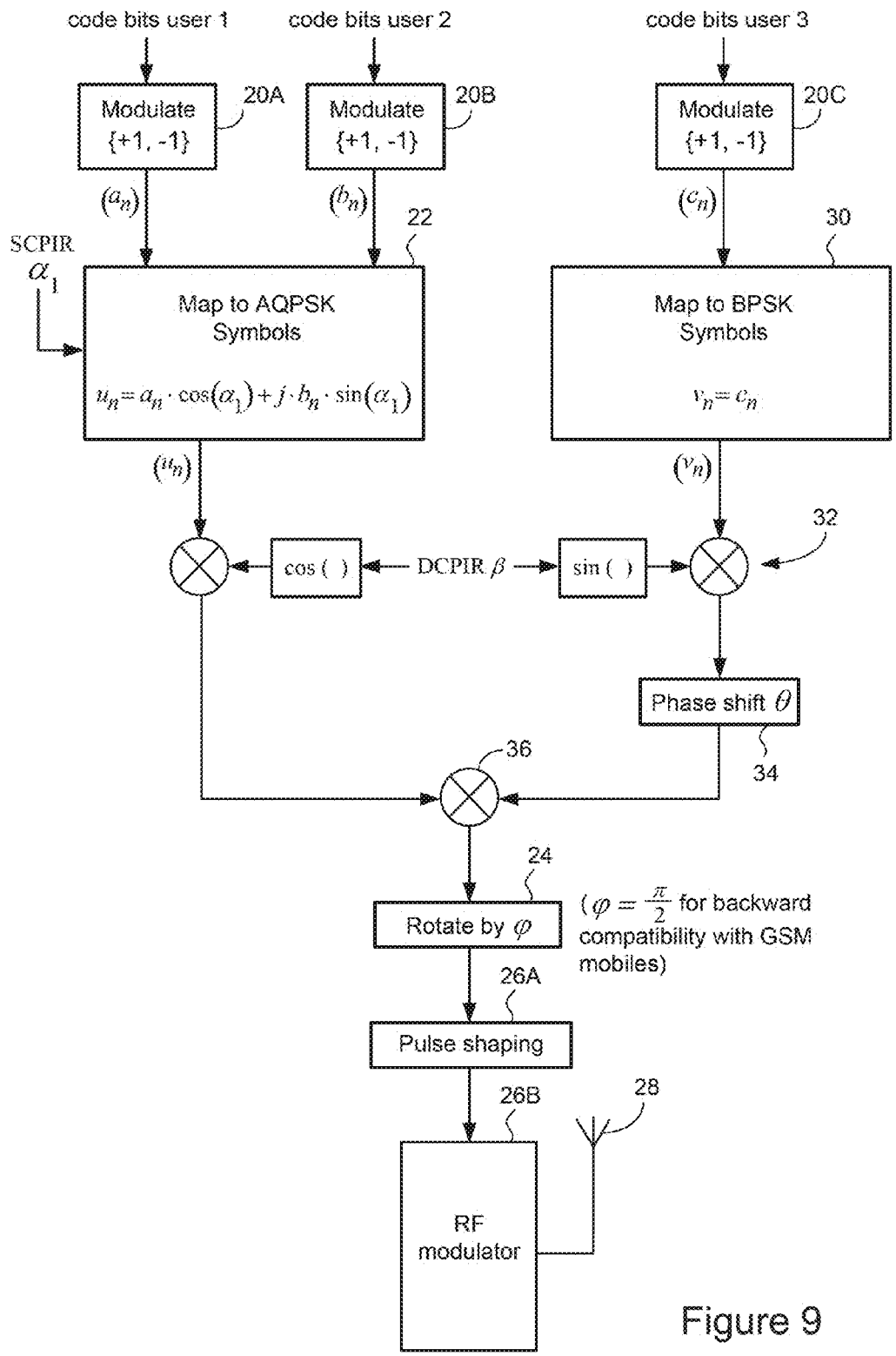
FIG. 9 illustrates one example embodiment of a Dual-AQPSK transmitter with one antenna.

Consider a one transmit antenna case like the example shown in FIG. 8. GSM BTS equipment is commonly deployed with only one Tx antenna. In this case, the same signal is transmitted from the BTS to all MS's. FIG. 9 illustrates one example embodiment of a Dual-AQPSK transmitter with one antenna transmitting to three users simultaneously on the same radio resource. The VAMOS modulator shown in FIG. 2 allows up to two users to share the same radio resource. The blocks from FIG. 2 including 20A, 20B, 22, 24, 26A, 26B (the pulse shaping and RF modulator are shown as one block 26 in FIG. 2), and 28 are similarly used in the DAQPSK modulator and transmitter in FIG. 9. The DAQPSK modulator allows the addition of a third user in this example embodiment. Sub-channel specific power control is provided by means of the parameters $0 \le \alpha_1$, $\beta \le \pi/2$. The angle $\alpha_1$ controls the subchannel power imbalance ratio (SCPIR), while the angle $\beta$ controls the dual-channel power imbalance ratio (DCPIR) as shown at 32. The SCPIR is defined by SCPIR=20×log$_{10}$(tan($\alpha_1$))dB, and the DCPIR is defined by DCPIR=20×log$_{10}$(tan($\beta$))dB.

The first stage in the DAQPSK modulator is to map the user code bits to +1 or −1 and generate three sequences of binary symbols $a_n$, $b_n$, $c_n$. The binary symbols of users 1 and 2 are mapped to AQPSK symbols $u_n$ with a SCPIR determined by $\alpha_1$. The binary symbols of user 3 are mapped to BPSK symbols, which is the identity mapping. The result is two sequences of symbols denoted $u_n$ (AQPSK) and $v_n$ (BPSK). They are scaled by cos($\beta$) and sin($\beta$) at 32 to obtain the desired DCPIR. The scaled symbols $v_n$, are phase shifted at 34 by an angle $\theta$. The two symbol streams are combined at summer 36, and then a rotated by an angle $\phi$ at 24. The rotation angle may be chosen in order to minimize the peak to average power ratio of the baseband signal, or it may be set to $\phi=\pi/2$ in order to obtain backward compatibility with legacy GSM MS's. The DCPIR also affects the peak to average power ratio of the transmitted signal.

If p is the pulse shaping filter 26A and T is the symbol period, then the continuous time baseband signal s(t) may be written as follows.

$$s(t) = \sum_n [G_1(a_n \cdot \cos(\alpha_1) + j \cdot b_n \cdot \sin(\alpha_1)) + G_2 \cdot e^{j\theta} c_n] \cdot e^{j\varphi n} p(t - nT),$$

where $G_1 = \cos(\beta)$, $G_2 = \sin(\beta)$, $0 \le \beta \le \pi/2$. Defining $\delta_n = \cos(\beta) \cdot (a_n \cos(\alpha_1) + j \cdot b_n \sin(\alpha_1)) + e^{j\theta} \cdot \sin(\beta) \cdot c_n$, the baseband signal can be re-written as $$s(t) = \sum_n \delta_n \cdot e^{j\varphi n} p(t - nT).$$

$\delta_n$ can take only 8 different values, since $a_n$, $b_n$, $c_n$ may only take two different values each. Therefore, these 8 values form a DAQPSK constellation. The parameters $\alpha_1$, $\beta$, which determine the SCPIR and DCPIR, may change from burst to burst. By tuning these parameters appropriately, it is possible to make the system backwards compatible with GSM MS's.

Figure 11B:
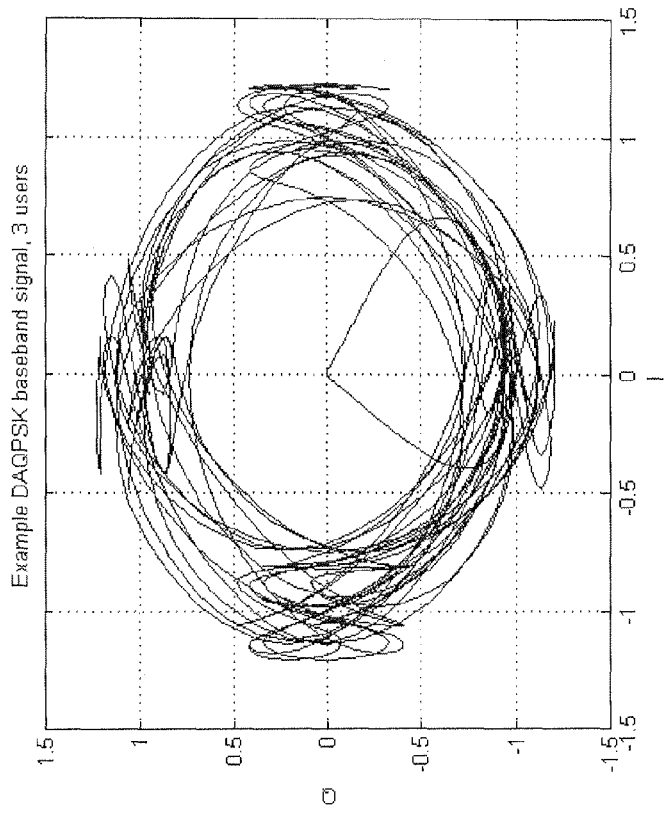
FIG. 11B illustrates baseband signals corresponding to the signal constellation of FIG. 10B for a DAQPSK signal for 3 UEs.
Figure 11A:
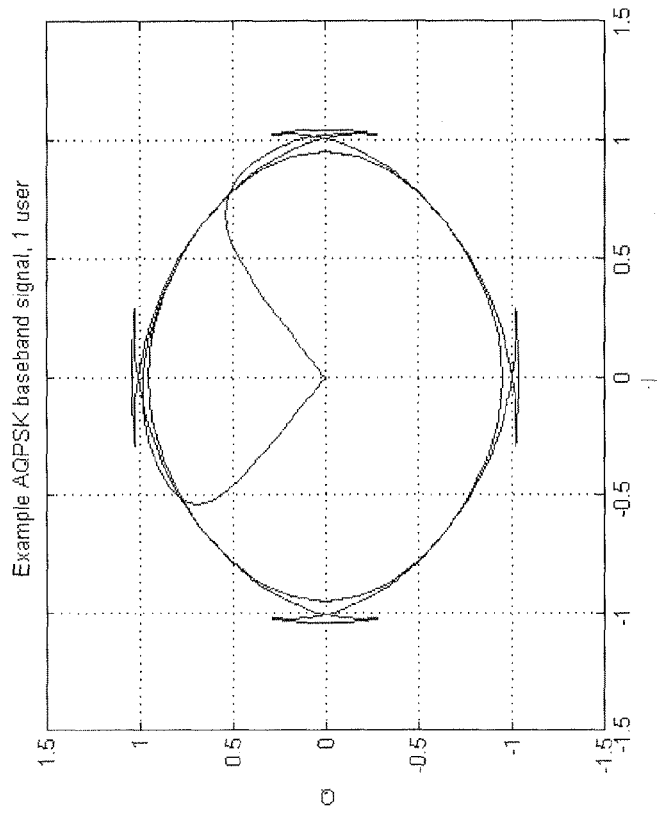
FIG. 11A illustrates baseband signals corresponding to the signal constellation of FIG. 10A for an AQPSK signal for one UE.

FIG. 10B shows an example of a DAQPSK constellation. For comparison a BPSK constellation is shown in FIG. 10A. The BPSK constellation can be interpreted as a degenerate AQPSK constellation with infinite SCPIR. Notice the similarities between the two symbol constellations. The corresponding baseband signals are shown in FIGS. 11B and 11A, respectively. A legacy GSM MS can decode the signal in both FIGS. 11A and 11B.

Figure 12B:
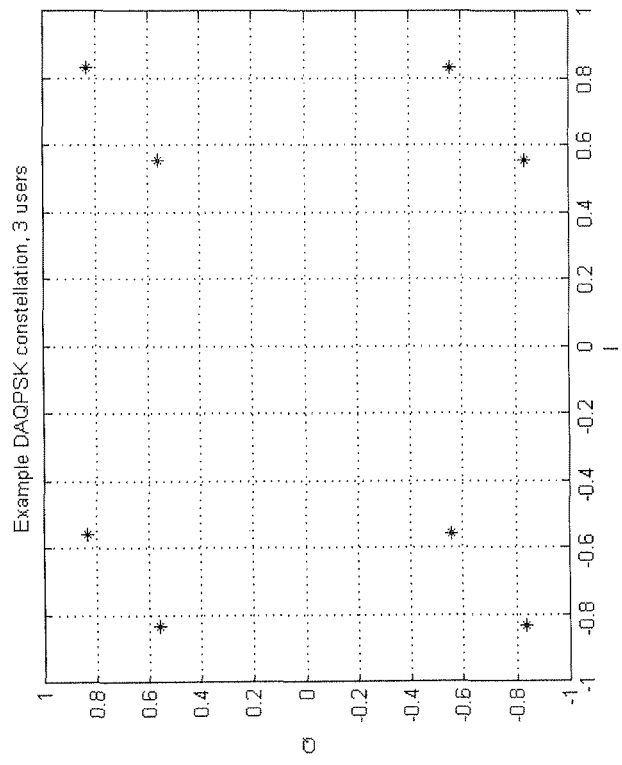
FIG. 12B shows an example DAQPSK constellation for three UEs.
Figure 12A:
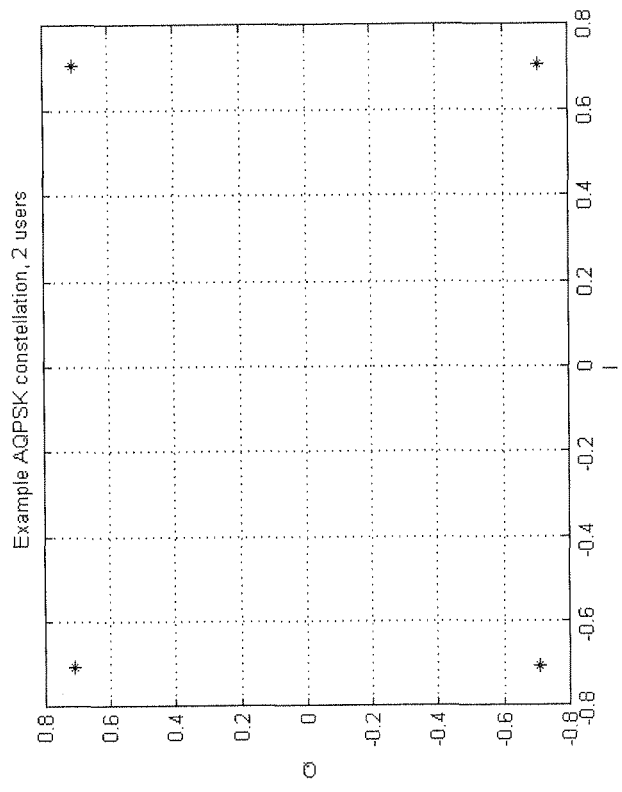
FIG. 12A shows an example AQPSK constellation for two UEs.
Figure 13B:
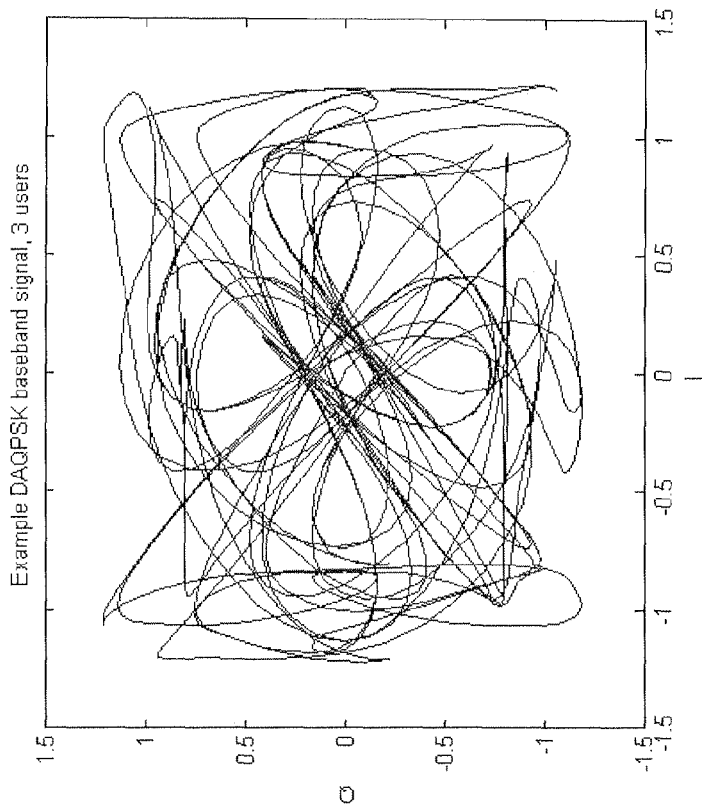
FIG. 13B illustrates baseband signals corresponding to the signal constellation of FIG. 12B for a DAQPSK signal for 3 UEs.
Figure 13A:
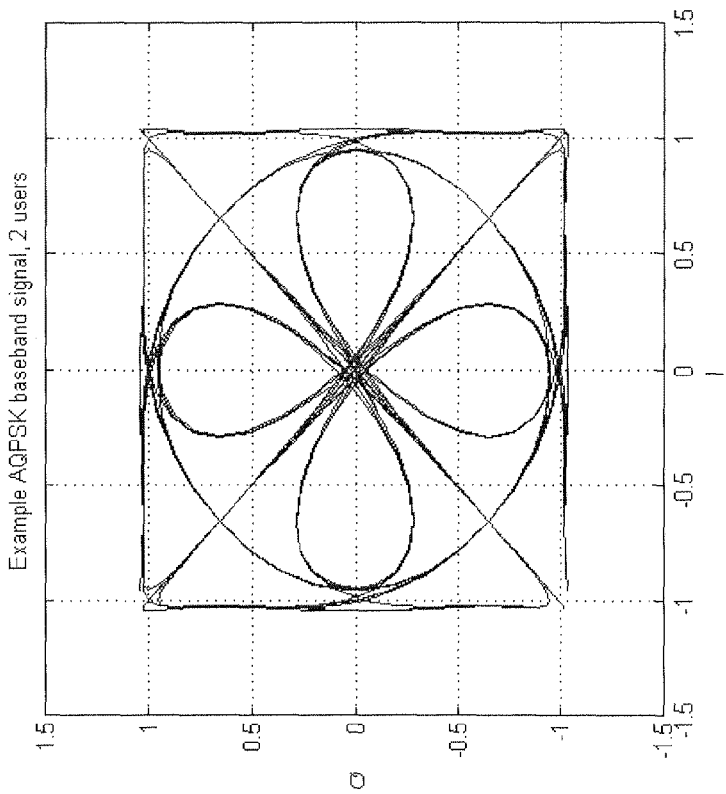
FIG. 13A illustrates baseband signals corresponding to the signal constellation of FIG. 12A for an AQPSK signal for two UEs.

FIG. 12A shows an example AQPSK constellation for two UEs, and FIG. 12B shows an example DAQPSK constellation for three UEs. Notice the similarities between the two constellations. FIG. 13A illustrates baseband signals corresponding to the signal constellation of FIG. 12A for an AQPSK signal for two UEs, and FIG. 13B illustrates baseband signals corresponding to the signal constellation of FIG. 12B for a DAQPSK signal for 3 UEs. A VAMOS capable GSM MS can receive the AQPSK signal in FIG. 13A and decode the code bits for any of the two users. Likewise, the same VAMOS capable GSM MS can receive the DAQPSK signal in FIG. 13B and decode the code bits for user 1 or user 2.

Note that with $\beta=\pi/2$, the DAQPSK modulator shown in FIG. 9 becomes a BPSK modulator (one user). Similarly, with $\beta=0$, the DAQPSK modulator (3 users) becomes an AQPSK modulator (2 users).

Figure 14:
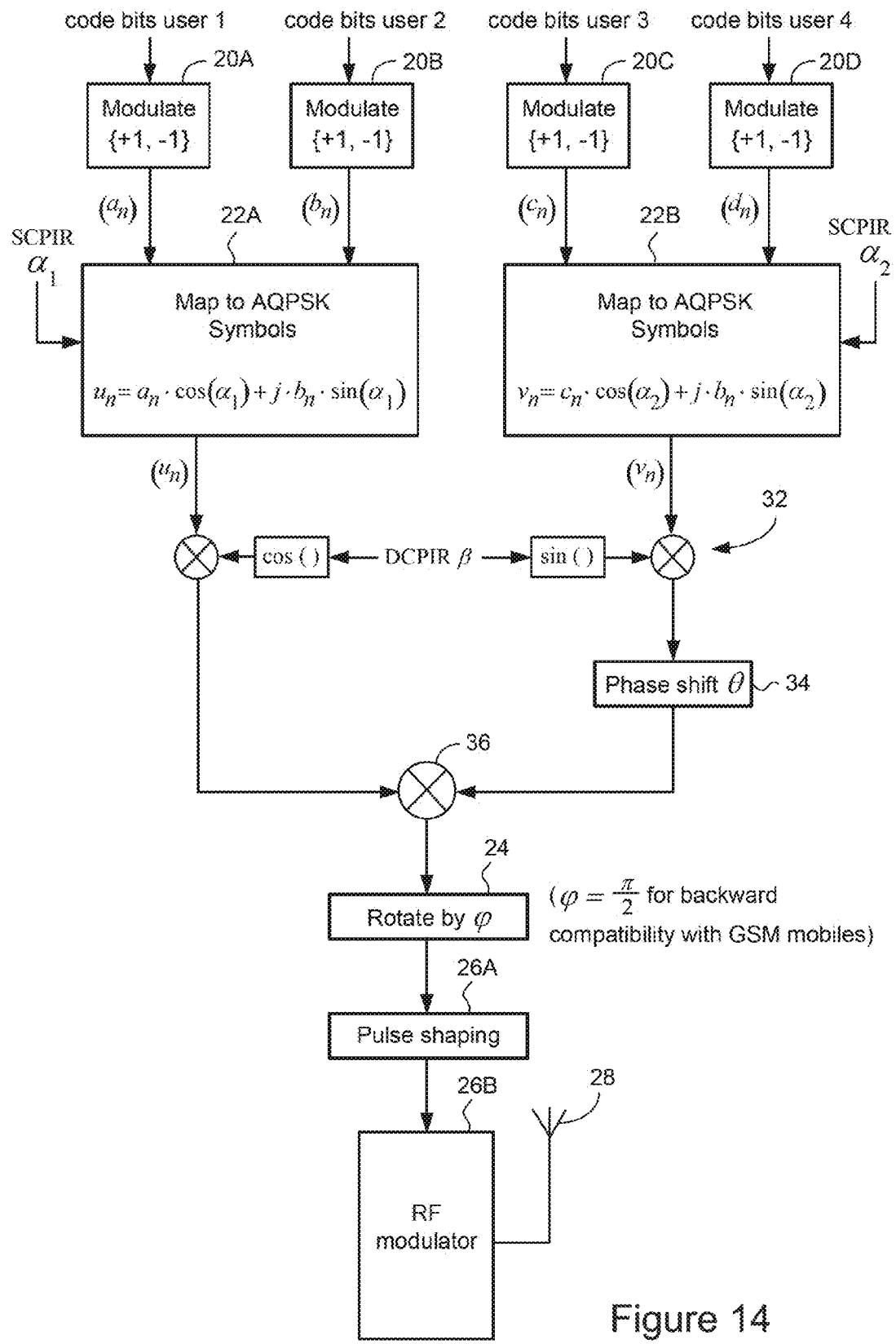
FIG. 14 illustrates an example embodiment of a Dual-AQPSK transmitter with one TX antenna and four UEs.

FIG. 14 illustrates an example embodiment of a Dual-AQPSK transmitter with one transmit (TX) antenna and four simultaneous users sharing the same radio resource. Four users are paired into two VAMOS pairs, the first pair having a SCPIR$_1$=20×log$_{10}$(tan($\alpha_1$))dB and the second VAMOS pair having a SCPIR$_2$=20×log$_{10}$(tan($\alpha_2$))dB.

Sub-channel specific power control is provided by way of the parameters $0 \le \alpha_1$, $\alpha_2$, $\beta \le \pi/2$. The angle $\alpha_1$ (resp. $\alpha_2$) controls the sub-channel power imbalance ratio between users 1 and 2 (resp. users 3 and 4), and the angle $\beta$ controls the dual-channel power imbalance ratio DCPIR. The DCPIR is given by DCPIR=20×log$_{10}$(tan($\beta$))dB.

The modulate blocks 20A-20D map respective user code bits to +1 or −1 to generate four sequences of binary symbols $a_n$, $b_n$, $c_n$, $d_n$. Mapper 22A maps the binary symbols of users 1 and 2 to AQPSK symbols with a SCPIR determined by $\alpha_1$, mapper 22B maps the binary symbols of users 3 and 4 to AQPSK symbols with a SCPIR determined by $\alpha_2$. This produces two sequences of symbols denoted $u_n$, $v_n$ that are scaled by cos($\beta$) and sin($\beta$) at 32 in order to obtain the desired DCPIR. The scaled symbols $v_n$ are phase shifted by an angle $\theta$ at 34. The summer 36 sums the two symbol streams, and then a rotation by an angle $\phi$ is applied at 24. This last rotation angle may be chosen in order to minimize the peak to average ratio of the baseband signal, or it may be set to $\phi=\pi/2$ in order to obtain backward compatibility with legacy GSM MS's. As mentioned above, the DCPIR also affects the peak to average power ratio of the transmitted signal.

Thus, two AQPSK channels are created and are referred to as dual AQPSK channels. The phase shift $\theta$ may be chosen in order to maximize the orthogonality between the two dual AQPSK channels.

If p is the pulse shaping filter 26A and T is the symbol period, then the continuous time baseband signal s(t) may be written as follows.

$$s(t) = \sum_n \lfloor G_1 \cdot (a_n \cos(\alpha_1) + j \cdot b_n \sin(\alpha_1)) + G_2 \cdot e^{j\theta}(c_n \cos(\alpha_2) + j \cdot d_n \sin(\alpha_2))\rfloor e^{j\varphi n} p(t - nT),$$

where $G_1 = \cos(\beta)$, $G_2 = \sin(\beta)$. Note that defining $\delta_n = \cos(\beta) \cdot (a_n \cdot \cos(\alpha_1) + j \cdot b_n \cdot \sin(\alpha_1)) + e^{j\theta} \cdot \sin(\beta) \cdot (c_n \cdot \cos(\alpha_2) + j \cdot d_n \cdot \sin(\alpha_2))$, the baseband signal can be re-written as $$s(t) = \sum_n \delta_n \cdot e^{j\varphi n} p(t - nT).$$

$\delta_n$ can take only can take only 16 different values, since $a_n$, $b_n$, $c_n$, $d_n$ are all binary. Therefore, these 16 values form a DAQPSK constellation.

Figure 15:
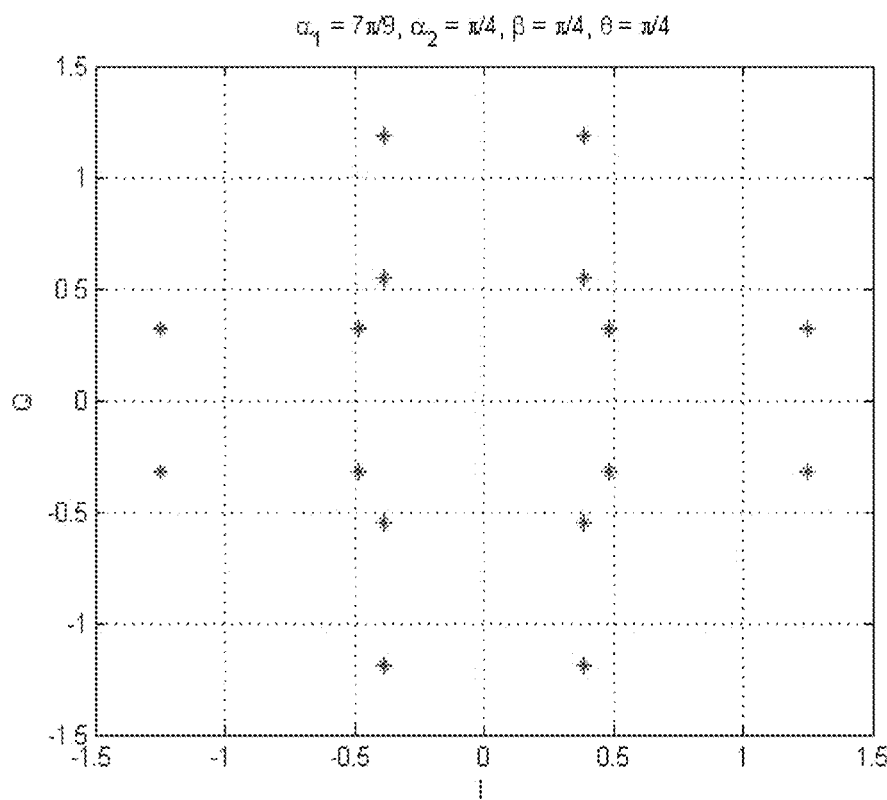
FIG. 15 illustrates an example DAQPSK constellation for four UEs.

FIG. 15 illustrates an example DAQPSK constellation for four MSs. Different values of the parameters $\alpha_1$, $\alpha_2$, $\beta$ result in different constellation shapes. These parameters, which determine the SCPIR and DCPIR, may change from burst to burst. By tuning the parameters $\alpha_1$, $\alpha_2$, $\beta$ appropriately, the system may be made backwards compatible with GSM MSs.

With the choices $\beta=0$ or $\beta=\pi/2$, the DAQPSK modulator becomes an AQPSK modulator (two users). With the choice $\alpha_2=0$, the DAQPSK modulator becomes the same as the 3-user DAQPSK modulator.

Figure 16:
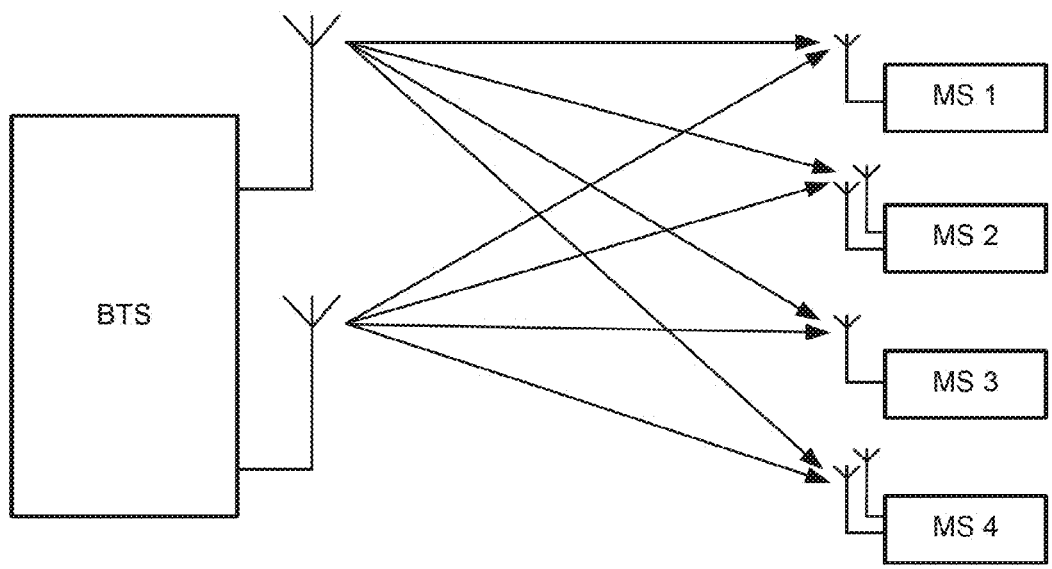
FIG. 16 illustrates an example embodiment with a base station transmitting with two antennas to four UEs.

When two Tx antennas are available at the base station, a MU-MIMO system with two transmitters may be formed as illustrated in FIG. 16. The figure also shows that one or more of the MS's may have two receive (Rx) antennas to provide Mobile Station Receive Diversity (MSRD). Multiple Rx antennas in the MS can improve the performance of the system, but are not necessary.

Figure 17:
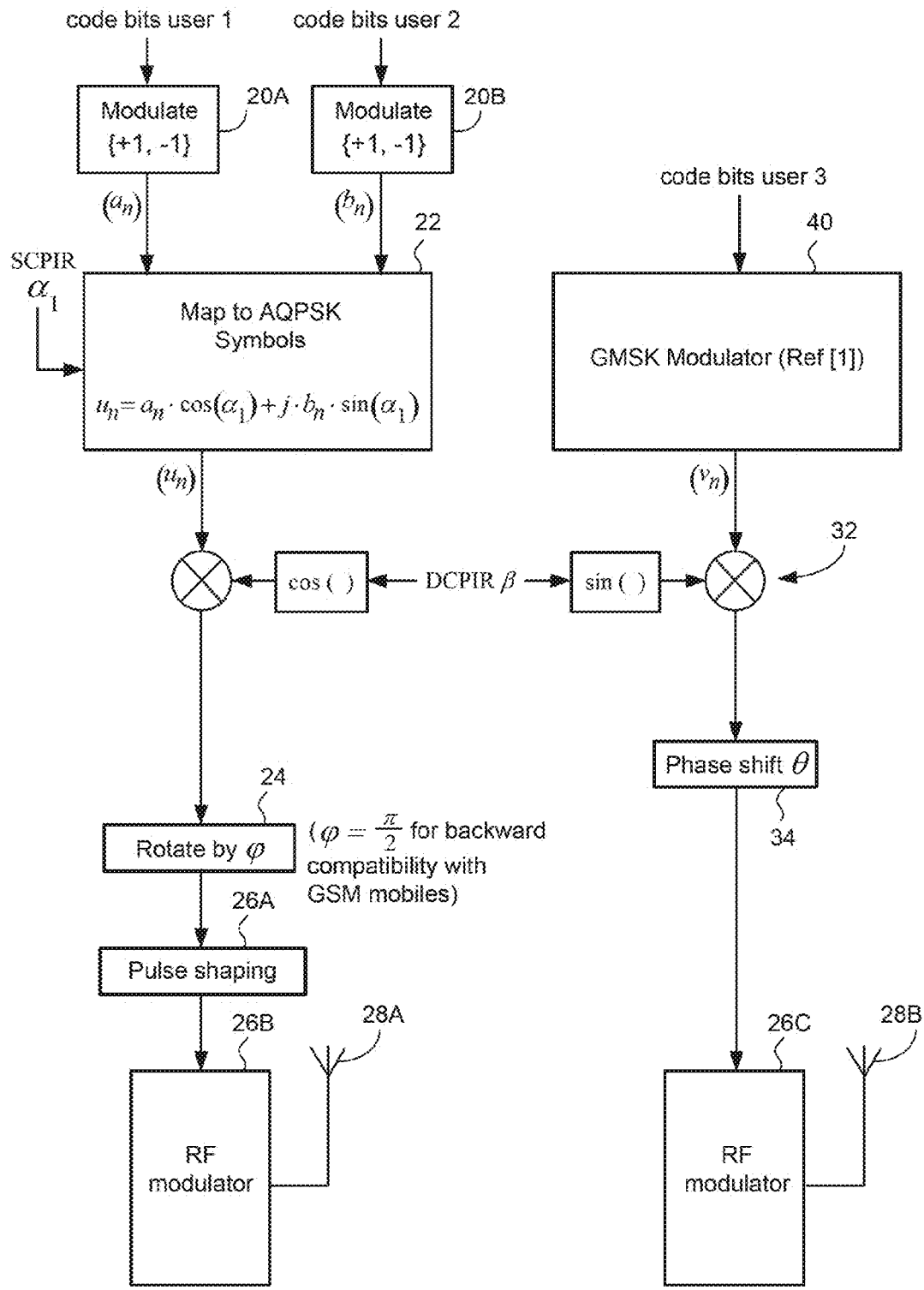
FIG. 17 illustrates an example embodiment of a DAQPSK transmitter for a base station transmitting with two TX antennas to three UEs.

As explained earlier, the modulator depends on the number of users. FIG. 17 illustrates an example DAQPSK modulator/transmitter embodiment which allows 3 users to share the same radio resource and uses two parallel transmitter chains. In the first chain, the user code bits for two users are mapped to +1 or −1 at 20A and 20B to generate two sequences of binary symbols $a_n$, $b_n$. Afterwards, the AQPSK mapper 22 maps the binary symbols of users 1 and 2 to AQPSK symbols with a SCPIR determined by $\alpha_1$. This gives one sequence of AQPSK symbols denoted $u_n$ in the figure. At 24, these symbols are rotated by an angle $\phi$, which may be chosen in order to minimize the peak to average ratio of the baseband signal, or it may be set to $\phi=\pi/2$ in order to obtain backward compatibility with legacy GSM MS's. The second chain is a GMSK transmitter chain which modulates the bits for the third user, for example as set forth in 3GPP TS 45.004 v. 10.0.0. A phase shift by an angle $\theta$ may also be applied to the GMSK signal at 34. The two chains are coupled by the gains $G_1=\cos(\beta)$, $G_2=\sin(\beta)$ that determine the DCPIR, $$DCPIR=20\times\log_{10}(\tan(\beta)), 0\leq\beta\leq\pi/2.$$

With $\beta=0$, the DAQPSK modulator becomes an AQPSK modulator (two users). With $\beta=\pi/2$, the DAQPSK modulator becomes a GMSK modulator (one user). Subchannel specific power control is provided by the parameters $0\leq\alpha_1$, $\beta\leq\pi/2$. They can be tuned to provide backward compatibility with legacy GSM MS's (both VAMOS capable and non-VAMOS capable.)

Figure 18:
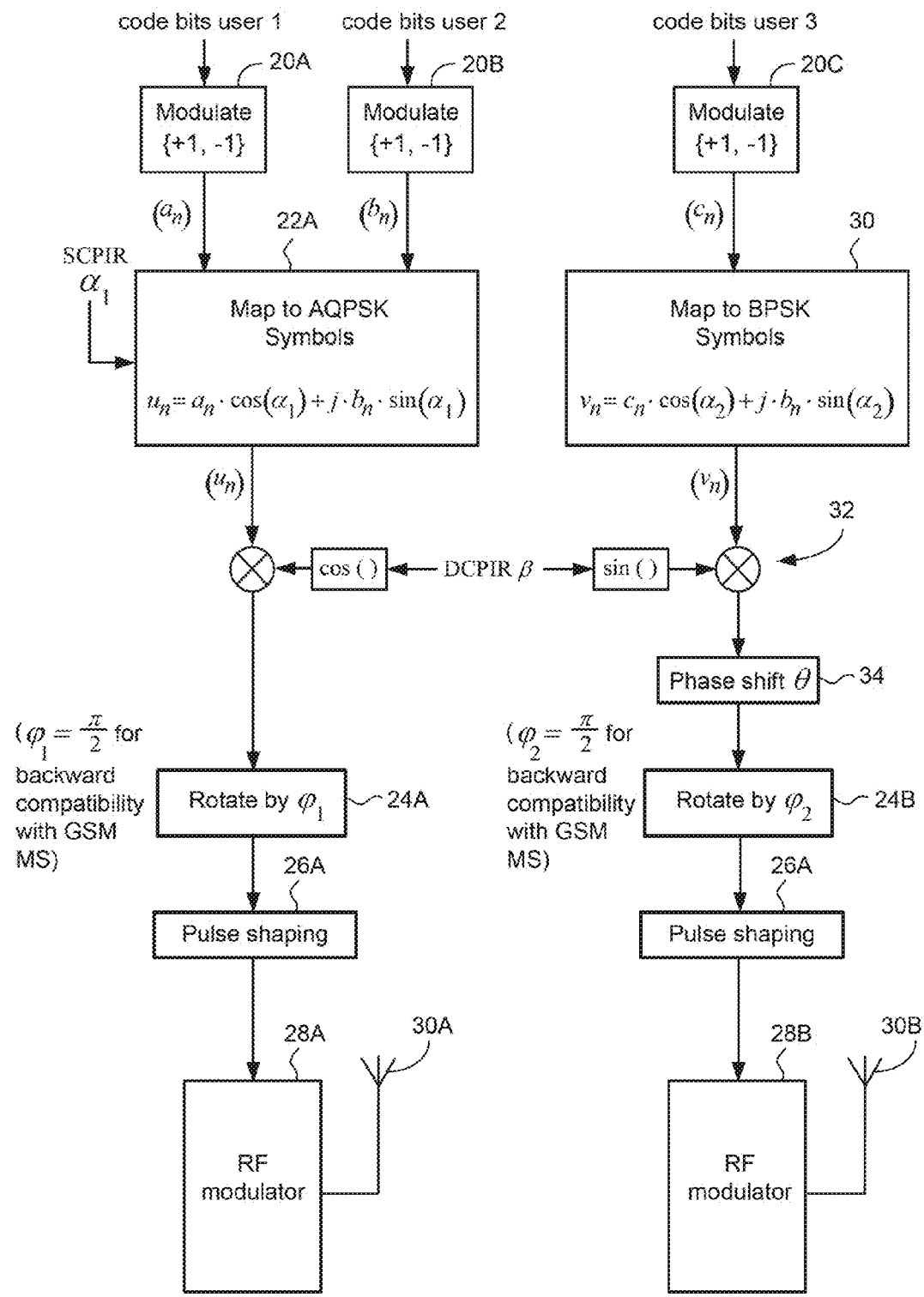
FIG. 18 illustrates another example embodiment of a DAQPSK transmitter for a base station transmitting with two TX antennas to three UEs.

FIG. 18 illustrates another example embodiment of a DAQPSK modulator which allows 3 users to share the same radio resource and includes two parallel transmitter chains. The first chain is the same as in FIG. 17. The second chain is a BPSK transmitter chain which modulates the bits for the third user. Modulator 20C maps the user code bits for the third user to binary symbols +1 or −1. Mapper 30 maps these to BPSK symbols (identity mapping). A phase shift by an angle $\theta$ may also be applied to the BPSK signal at 34. Afterwards, the symbols are rotated by an angle $\phi_2$ at 24B. As in the first chain, this rotation angle may be chosen in order to minimize the peak to average ratio of the baseband signal, or it may be set to $\phi_2=\pi/2$ in order to obtain backward compatibility with legacy GSM MS's. The two chains are coupled by the gains $G_1=\cos(\beta)$, $G_2=\sin(\beta)$ that determine the DCPIR, $$DCPIR=20\times\log_{10}(\tan(\beta)), 0\leq\beta\leq\pi/2.$$

With $\beta=0$ the DAQPSK modulator becomes simply an AQPSK modulator (two users). With $\beta=\pi/2$ the DAQPSK modulator becomes a BPSK modulator (one user). Sub-channel specific power control is provided by the parameters $0\leq\alpha_1$, $\beta\leq\pi/2$. They can be tuned to provide backward compatibility with legacy GSM MS's (both VAMOS capable and non-VAMOS capable.)

Figure 19:
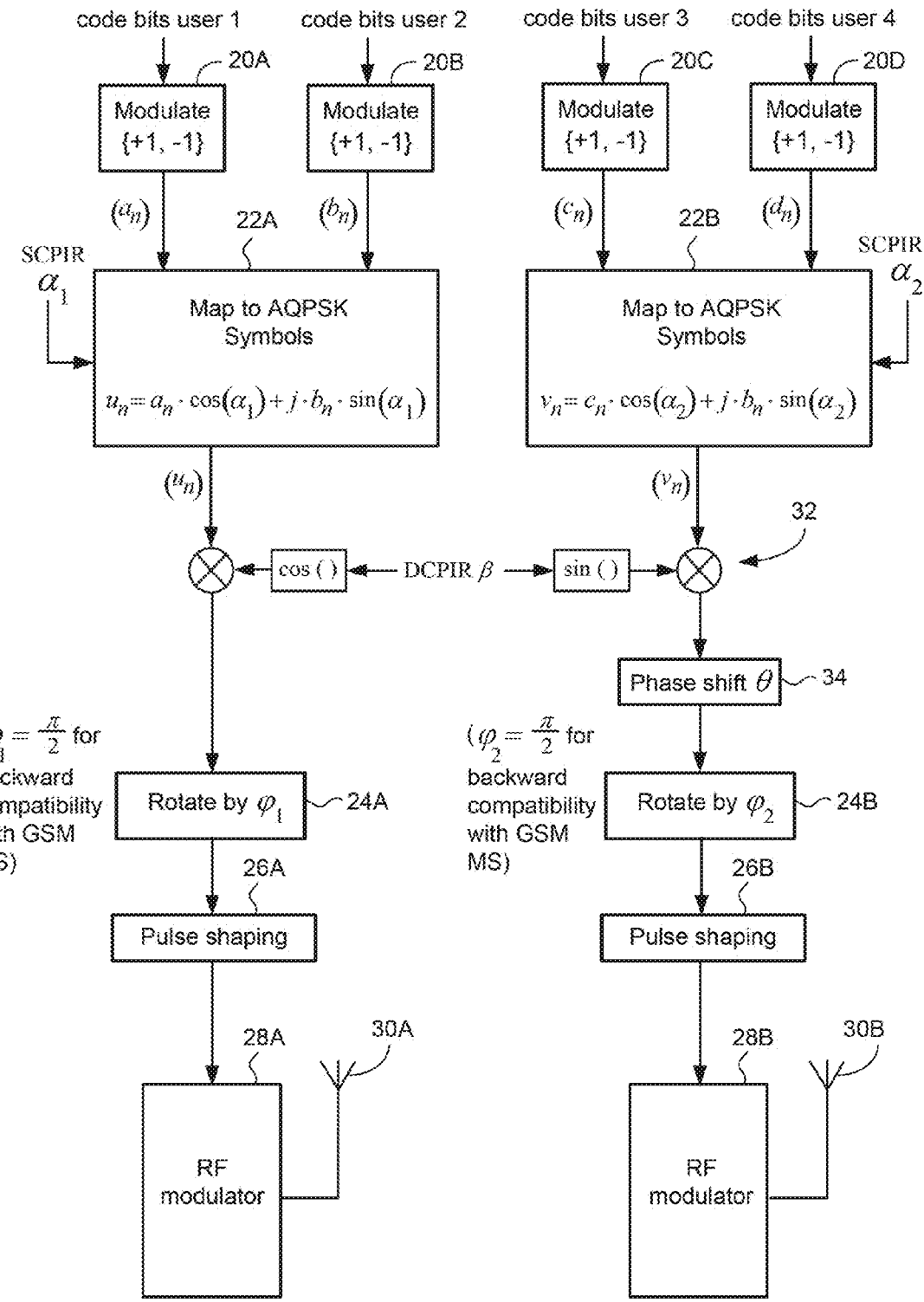
FIG. 19 illustrates another example embodiment of a DAQPSK transmitter for a base station transmitting with two TX antennas to four UEs.

FIG. 19 illustrates another example embodiment of a DAQPSK transmitter for a base station transmitting with two TX antennas to four UEs where the 4 users share the same radio resource. Two parallel transmitter chains are used and each corresponds to the first transmitter chain in FIG. 9. In the first chain, the binary symbols of users 1 and 2 are mapped to AQPSK symbols with a SCPIR determined by $\alpha_1$. The second chain is similar to the first chain, but it is used to modulate the bits for users 3 and 4. The SCPIR is determined by $\alpha_2$. The rotation angle $\phi_2$ may be equal or may be different from $\phi_1$. The two chains are coupled by the gains $G_1=\cos(\beta)$, $G_2=\sin(\beta)$ that determine the DCPIR, $$DCPIR=20\times\log_{10}(\tan(\beta)), 0\leq\beta\leq\pi/2.$$

Similar to other embodiments, with $\beta=0$ or $\beta=\pi/2$, the DAQPSK modulator becomes simply an AQPSK modulator (two users). Sub-channel specific power control is provided by means of the parameters $0\leq\alpha_1$, $\alpha_2$, $\beta\leq\pi/2$. They can be tuned to provide backward compatibility with legacy GSM MS's (both VAMOS capable and non-VAMOS capable.)

The DAQPSK modulator may be applied to more than 2 Tx antennas. For example, if 3 or 4 Tx antennas are available, then up to 4 parallel GMSK modulators can be employed (for 3 or 4 users), coupled by gains that determine the relative sub-channel powers. Such an example transmitter may be a variation of the modulator shown in FIG. 17.

Regarding pulse shaping at 26A and 26B, there are many possible choices, and any suitable choice may be used. One non-limiting example pulse shaping filter is specified in section 3.5 of 3GPP TS 45.001 for 8PSK and VAMOS modulated signals. This pulse is called a linearized GMSK pulse and ensures that the spectrum of the transmitted signals satisfies the spectrum requirements in 3GPP TS 45.005. But again, other pulses, either spectrally narrow or spectrally wide, may also be employed. For example, GP-120152, "Wide pulse for VAMOS," contribution to 3GPP GERAN #53 by Ericsson and ST-Ericsson describes a spectrally wide pulse for VAMOS.

In FIGS. 18 and 19, the two pulse shaping filters 26A and 26B do not have to use the same pulse shaping filter. For example, in FIG. 18, a spectrally wide pulse may be used for user 3 and a spectrally narrow pulse may be used for users 1 and 2, and vice-versa. Similarly, in FIG. 19, a spectrally narrow pulse can be used for users 1 and 2, while a spectrally wide pulse can be used for users 3 and 4, and vice versa. It is also possible to use two different spectrally narrow pulses or two different spectrally wide pulses.

Figure 20:
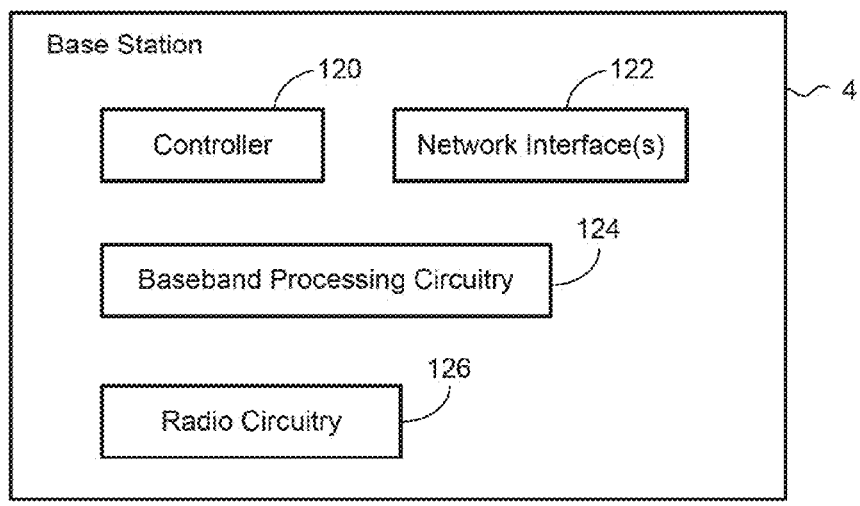
FIG. 20 is a function block diagram of a non-limiting example base station.

FIG. 20 is a function block diagram of an example base station 4 that may be used to implement the various example embodiments of DAQPSK modulator/transmitters described above as well as other DAQPSK modulator/transmitters. Radio circuitry 120 permits radio communications with other radio nodes like UEs for example and may include for example one or multiple antennas, transmitter and receiver functions, conversion between RF and baseband, etc. Baseband processing circuitry 124 performs baseband operations on down-converted signals from the radio circuitry 126 and signals to be up-converted to RF by the radio circuitry 126. One or more network interfaces 122 allow the base station 4 to communicate with other network nodes including for example other base station nodes, base station control nodes, core network nodes, relay nodes, stand alone nodes, etc.

Controller 120 coordinates the operation of the radio circuitry 126, baseband processing circuitry 124, and network interface(s) 122 to accomplish the tasks and operations described above. The controller 120 may include and/or have access to one or more memories that may store instructions for execution by the processing circuitry as well as data. Blocks 120-126 may communicate using one or more communication buses.

Figure 21:
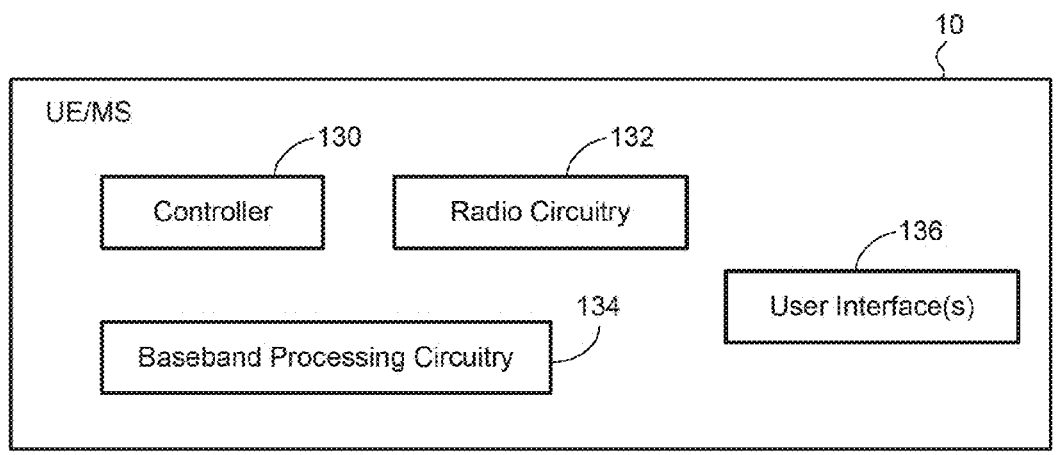
FIG. 21 is a function block diagram of a non-limiting example MS/UE.

FIG. 21 is a function block diagram of an example MS or UE 10 for receiving downlink information from the base station using one or more DAQPSK modulators/transmitters and transmitting uplink information to the base station. Radio circuitry 132 permits radio communications with radio network nodes like base station 4 and may include for example one or more antennas, transmitter and receiver functions, conversion between RF and baseband, etc. Baseband processing circuitry performs baseband operations on down-converted signals from the radio circuitry 132 and signals to be up-converted to RF by the radio circuitry 132. A user interface 136 allows user to direct the UE to perform various data processing and communication operations and typically includes some sort of output mechanism, e.g., display, and input mechanism, e.g., keypad, touch screen, voice recognition, etc. A controller 130 includes data processing circuitry that performs various UE functions including coordinating the radio circuitry 132, baseband processing circuitry 134, and user interface(s) 136 to accomplish the tasks and operations necessary to perform the receiving downlink information from the base station using one or more DAQPSK modulators/transmitters and transmitting uplink information to the base station. The controller 130 may include and/or have access to one or more memories that may store instructions for execution by the processing circuitry as well as data. Blocks 130-136 may communicate using one or more communication buses.

Still other aspects of the technology include one or more computer products embodied in a non-transitory, computer-readable storage medium containing instructions, which when executed by processing circuitry, perform the functions described above for the base station and/or the MS/UE. For example, one non-transitory, computer-readable storage medium is configured for use with a base station node, and another non-transitory, computer-readable storage medium is configured for use with MSs/UEs.

The described technology provides many advantages. For example, it allows better utilization of the air interface. In GSM, for example, it enables up to 8 half users or 4 full rate users to be multiplexed on the same time slot and radio frequency channel. The technology is backward compatible with commonly used GSM transmitter and receiver equipment. Legacy GSM MS (non-VAMOS, non-DARP) can be assigned to one of the 3 or 4 sub-channels. GSM MS supporting SAIC, DAIC (i.e. DARP Phase I and DARP phase II), VAMOS I or VAMOS II can be assigned to one or more of the 3 or 4 sub-channels. The technology is compatible with legacy GSM BTS equipment, and depending on the implementation, only software upgrades may be needed.

Although the description above contains many specifics, these should not be construed as limiting the scope of the claims but as merely providing illustrations of example embodiments. It will be appreciated that the technology claimed fully encompasses other embodiments which may become apparent to those skilled in the art, and that the scope of the claims is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved for it to be encompassed hereby. No element, block, or instruction used in the present application should be construed as critical or essential to the implementations described herein unless explicitly described as such. Further, the phrase "based on" is intended to mean "based, at least in part, on" unless explicitly stated otherwise. Unclaimed subject matter is not dedicated to the public and Applicant reserves all rights in unclaimed subject matter including the right to claim such subject matter in this and other applications, e.g., continuations, continuations in part, divisions, etc.

The invention claimed is:

1. A radio base station for a radio communications system that conducts radio communications over a radio interface using basic physical channels, where each basic physical channel defines a time slot and a radio frequency for transmission, comprising:
   circuitry configured to establish radio communication between a radio base station and multiple full rate or half rate user equipments (UEs) over the same basic physical channel, where at least three subchannels are provided in the same basic physical channel that can simultaneously support three full rate UE communications, the circuitry including:
   a first baseband transmitter chain configured to map full rate data corresponding to first and second full rate UE communications as adaptive quadrature phase shift keying, AQPSK, signals onto a first and a second of the three subchannels, and
   a second baseband transmitter chain configured to map full rate data corresponding to a third full rate UE communication as rotated binary phase shift keying signals or as Gaussian minimum shift keying signals onto a third of the three subchannels, wherein the second baseband transmitter chain is configured to operate separate, but in parallel with, the first baseband transmitter chain.

2. The radio base station in claim 1, wherein the first baseband transmitter chain is configured so that it can map full rate data corresponding to the first and second full rate UE communications as AQPSK signals onto the first and second subchannels and the second baseband transmitter chain is configured so that it can map full rate data corresponding to the third full rate UE communication as rotated binary phase shift keying signals or as Gaussian minimum shift keying signals onto the third subchannel.

3. The radio base station in claim 1, wherein first baseband transmitter chain includes mapping circuitry configured so that it can map full rate data corresponding to the first and second full rate UE baseband communications in a complex plane using a first angle associated with a subchannel power imbalance, and wherein the first and second baseband transmitter chains are configured to apply a scaling factor based on a second angle associated with a dual-channel subchannel power imbalance to a signal generated by the first baseband transmitter chain and to a signal generated by the second baseband transmitter chain.

4. The radio base station in claim 3, wherein the second baseband transmitter chain includes first phase shifting circuitry configured to apply a first phase shift angle to the scaled signal.

5. The radio base station in claim 4, wherein the circuitry further comprises:

a summer configured to sum the signals from the first and second baseband transmitter chains, pulse shaping circuitry configured to shape pulses corresponding to the symbols in the summed signal, RF modulation circuitry configured to convert the pulses from the pulse shaping circuitry to an RF signal, and an antenna for transmitting the RF signal over the same basic physical channel.

6. The radio base station in claim 5, wherein the circuitry further comprises second phase shifting circuitry configured to apply a second phase shift angle to the summed signal prior to processing by the pulse shaping circuitry.

7. The radio base station in claim 3, wherein the second baseband transmitter chain includes first phase shifting circuitry configured to apply a first phase shift angle to the scaled signal, and the radio base station further comprises second phase shifting circuitry configured to apply a second phase shift angle to the scaled signal.

8. The radio base station in claim 7, wherein the radio base station further comprises:

pulse shaping circuitry configured to receive a signal from the respective second phase shifting circuitry and shape pulses corresponding to the symbols in the received signal, RF modulation circuitry configured to convert the pulses received from the pulse shaping circuitry to an RF signal, and an antenna for transmitting the RF signal over the same basic physical channel.

9. The radio base station in claim 1, wherein each of the three subchannels is configured to simultaneously support one full rate UE communication and its associated control signaling or two different half rate UE communications and their associated control signaling.

10. The radio base station in claim 1, wherein the three subchannels are configured to simultaneously support six different half rate UE communications and their associated control signaling, the circuitry including:

a first baseband transmitter chain to map half rate data corresponding to first, second, third, and fourth half rate UE communications as AQPSK signals onto the first and second subchannels, and a second baseband transmitter chain to map half rate data corresponding to fifth and sixth half rate UE communications as phase shifted signals onto the third subchannel.

11. The radio base station in claim 1, wherein a fourth subchannel is provided in the same basic physical channel and, wherein each of the four subchannels is configured to simultaneously carry one full rate UE communication and its associated control signaling or two different half rate UE communications and their associated control signaling.

12. The radio base station in claim 11, wherein the first baseband transmitter chain is configured to map full rate data as AQPSK signals corresponding to first and second full rate UE baseband communications onto the first and second subchannels and the second transmitter chain is configured to map full rate data corresponding to third and fourth full rate UE baseband communications as AQPSK signals onto the third and fourth subchannels.

13. The radio base station in claim 11, wherein the first baseband transmitter chain includes mapping circuitry configured to map full rate data corresponding to first and second full rate UE baseband communications in a complex plane using a first angle associated with a subchannel power imbalance, wherein the second baseband transmitter chain includes mapping circuitry configured to map full rate data corresponding to third and fourth full rate UE baseband communications in a complex plane using a second angle associated with the subchannel power imbalance, and wherein the first and second baseband transmitter chains are configured to apply a scaling factor based on a third angle associated with a dual-channel subchannel power imbalance to a signal generated by the first baseband transmitter chain and to a signal generated by the second baseband transmitter chain.

14. The radio base station in claim 13, wherein the second baseband transmitter chain includes first phase shifting circuitry configured to apply a first phase shift angle to the scaled signal.

15. The radio base station in claim 14, wherein the circuitry further comprises:

a summer configured to sum the signals from the first and second baseband transmitter chains, pulse shaping circuitry configured to shape pulses corresponding to the symbols in the summed signal, RF modulation circuitry configured to convert the pulses received from the pulse shaping circuitry to an RF signal, and an antenna for transmitting the RF signal over the same basic physical channel.

16. The radio base station in claim 15, wherein the circuitry further comprises second phase shifting circuitry configured to apply a second phase shift angle to the summed signal prior to processing by the pulse shaping circuitry.

17. The radio base station in claim 13, wherein the second baseband transmitter chain includes first phase shifting circuitry configured to apply a first phase shift angle to the scaled signal, and wherein the first and second baseband transmitter chains each include second phase shifting circuitry configured to apply a second phase shift angle to the scaled signal.

18. The radio base station in claim 17, wherein the circuitry further comprises:

pulse shaping circuitry configured to receive a signal from the respective second phase shifting circuitry and shape pulses corresponding to the symbols in the received signal, RF modulation circuitry configured to convert the pulses received from the pulse shaping circuitry to an RF signal, and an antenna for transmitting the RF signal over the same basic physical channel.

19. The radio base station in claim 11, wherein the four subchannels are configured to simultaneously carry eight different half rate UE communications, the circuitry including:

a first baseband transmitter chain to map half rate data corresponding to first, second, third, and fourth half rate UE baseband communications as quadrature AQPSK signals onto the first and second subchannels, and a second baseband transmitter chain to map half rate data corresponding to fifth, sixth, seventh, and eighth half rate UE baseband communications as phase shifted signals onto the third and fourth subchannels.

20. The base station in claim 1, wherein radio transmissions associated with the first and second baseband transmitter chains are backwards compatible to legacy base stations and legacy UEs.

21. The base station in claim 1, further comprising receiver circuitry configured to receive on a same basic physical channel three or four different full rate UE communications and to demodulate the three or four different full rate UE communications using different training sequences associated with each of the three or four different full rate UE communications.

22. The base station in claim 1, further comprising receiver circuitry configured to receive on a same basic physical channel up to four full rate UE communications, up to seven or eight different half rate UE communications, or a combination of full rate and half rate UE communications that have a capacity corresponding to four full rate UE communications and to demodulate up to four full rate UE communications, up to seven or eight different half rate UE communications, or the combination of full rate and half rate UE communications using different training sequences associated with each of the different UE communications.

23. A method implemented in a radio base station for radio communications over a radio interface using basic physical channels, where each basic physical channel defines a time slot and a radio frequency for transmission, comprising:
 establishing radio communication between the radio base station and multiple full rate or half rate user equipments (UEs) over the same basic physical channel, where at least three subchannels are provided in the same basic physical channel that can simultaneously support an amount of data equivalent to three full rate UE communications,
 mapping by a first baseband transmitter onto a first and a second of the three subchannels a first amount of data equivalent to first and second full rate UE communications as adaptive quadrature phase shift keying, AQPSK, signals, and
 mapping by a second baseband transmitter onto a third of the three subchannels a second amount of data equivalent to a third full rate UE communication as rotated binary phase shift keying signals or as Gaussian minimum shift keying signals, wherein the second baseband transmitter is configured to operate separate, but in parallel with, the first baseband transmitter.

24. The method in claim 23, wherein the first baseband transmitter maps the first amount of data as AQPSK signals onto the first and second subchannels, and the second baseband transmitter maps the second amount of data as rotated binary phase shift keying signals or as Gaussian minimum shift keying signals onto the third subchannel.

25. The method in claim 23, wherein the first baseband transmitter maps the first amount of data in a complex plane using a first angle associated with a subchannel power imbalance, and wherein the first and second baseband transmitters apply a scaling factor that is based on a second angle associated with a dual-channel subchannel power imbalance to a signal generated by the first baseband transmitter chain and to a signal generated by the second baseband transmitter chain, respectively.

26. The method in claim 25, further comprising the second baseband transmitter chain applying a first phase shift angle to the scaled signal.

27. The method in claim 26, further comprising:
 summing the signals from the first and second baseband transmitter chains,
 receiving the summed signal and shaping pulses corresponding to the symbols in the summed signal,
 converting the pulses to an RF signal, and
 transmitting the RF signal over the same basic physical channel.

28. The method in claim 23, wherein each of the three subchannels is configured to simultaneously carry one full rate UE communication and its associated control signaling or two different half rate UE communications and their associated control signaling.

29. The method in claim 23, wherein a fourth subchannel is provided in the same basic physical channel, and wherein each of the four subchannels is configured to simultaneously carry one full rate UE communication and its associated control signaling or two different half rate UE communications and their associated control signaling.

30. The method in claim 23, further comprising:
 receiving on a same basic physical channel up to four full rate UE communications, up to seven or eight different half rate UE communications, or a combination of full rate and half rate UE communications that have a capacity corresponding to four full rate UE communications, and
 demodulating up to four full rate UE communications, up to seven or eight different half rate UE communications, or the combination of full rate and half rate UE communications using different training sequences associated with each of the different UE communications.

* * * * *